United States Patent [19]

Shimpuku et al.

[11] Patent Number: 5,138,314
[45] Date of Patent: Aug. 11, 1992

[54] METHOD FOR CONVERTING AND/OR DETECTING DATA

[75] Inventors: Yoshihide Shimpuku, Kanagawa; Hiroyuki Ino, Tokyo; Yasuyuki Chaki, Chiba, all of Japan

[73] Assignee: Sony Corporation, Tokyo, Japan

[21] Appl. No.: 728,732

[22] Filed: Jul. 11, 1991

[30] Foreign Application Priority Data

Jul. 18, 1990 [JP] Japan .................................. 2-190151
Jul. 26, 1990 [JP] Japan .................................. 2-198439

[51] Int. Cl.$^5$ ....................... H03M 7/00; H03M 7/20; H04L 25/34
[52] U.S. Cl. ........................................ 341/58; 375/17; 375/101; 341/102; 341/106
[58] Field of Search ................ 341/58, 50, 106, 102; 375/17, 18, 101; 360/32, 39, 65

[56] References Cited

U.S. PATENT DOCUMENTS

| | | | |
|---|---|---|---|
| 4,584,690 | 4/1986 | Cafiero et al. | 375/18 |
| 4,953,160 | 8/1990 | Gupta | 375/17 X |
| 5,018,134 | 5/1991 | Kokubo et al. | 370/32.1 |
| 5,025,443 | 6/1991 | Gupta | 375/18 X |
| 5,027,369 | 6/1991 | Kuenast | 375/14 |

*Primary Examiner*—Sharon D. Logan
*Attorney, Agent, or Firm*—Lewis H. Eslinger; Donald S. Dowden

[57] ABSTRACT

In a data conversion method of converting source data of M bit unit to be recorded on a recording medium into conversion data of N (>M) bit unit, n, which is a number of inter-symbol interferences permitted in a transmission path, continuous codes in the codes of the conversion data are weighted with a weighting distribution decreasing linearly from a distribution center, the weighted n continuous codes are sequentially added to form the intermediate series, and then such conversion data that the sum of absolute values of differences of codes between the intermediate series (i.e., the code length) is more than a predetermined number of times as large as a reference value of the weighting coefficient is selected as a modulation code, whereby the pattern length between the code patterns can be made larger to thereby improve the recording density remarkably with using the present recording medium and recording and/or reproducing apparatus. Further, the pattern of the reproduced signal corresponding to the data to be detected is compared with a code pattern group corresponding to each conversion data to select a similar pattern so that the conversion data recorded at a remarkably high recording density can be positively detected while using the present recording medium and recording and/or reproducing apparatus.

4 Claims, 28 Drawing Sheets

FIG. 7
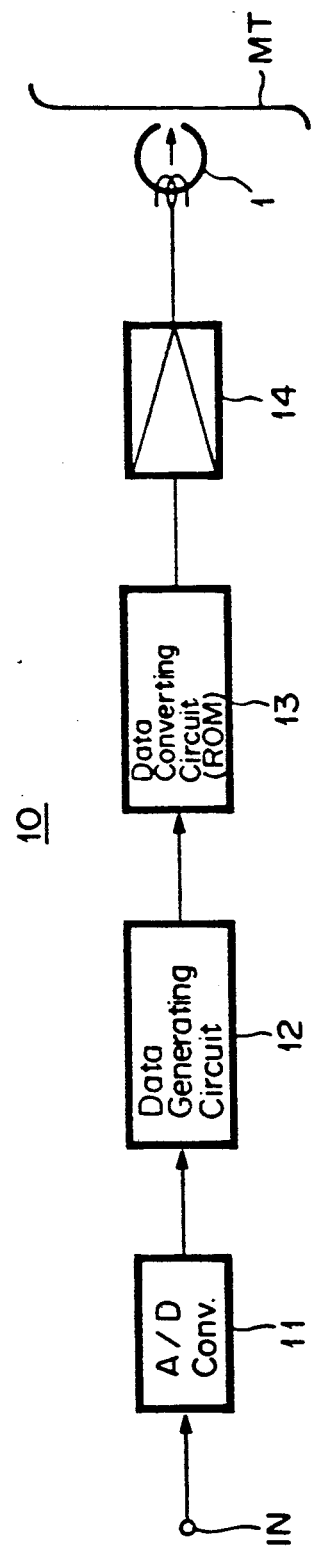
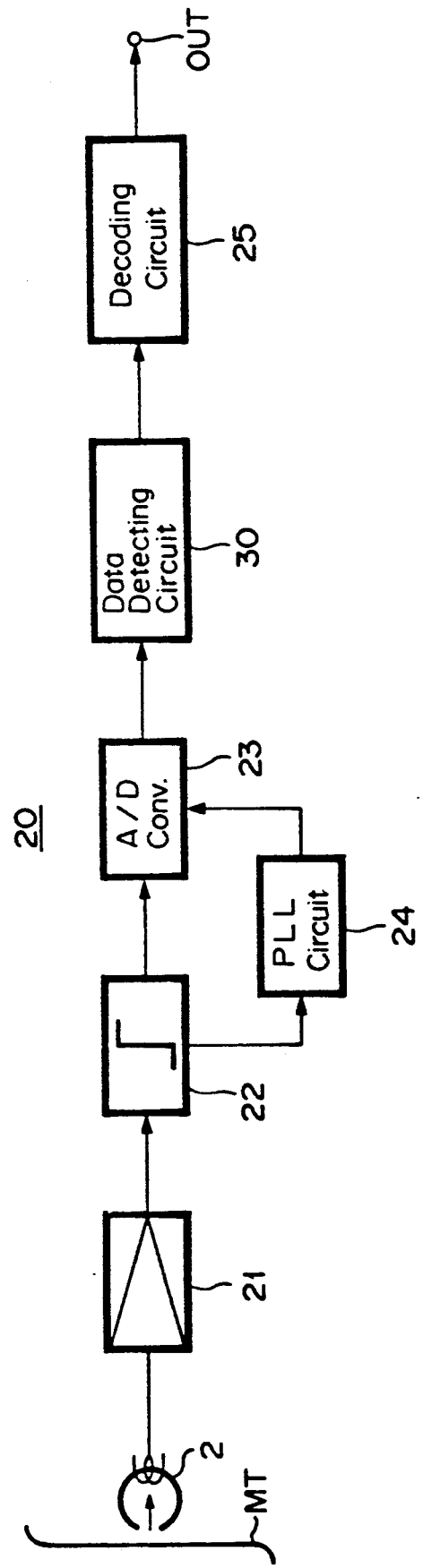

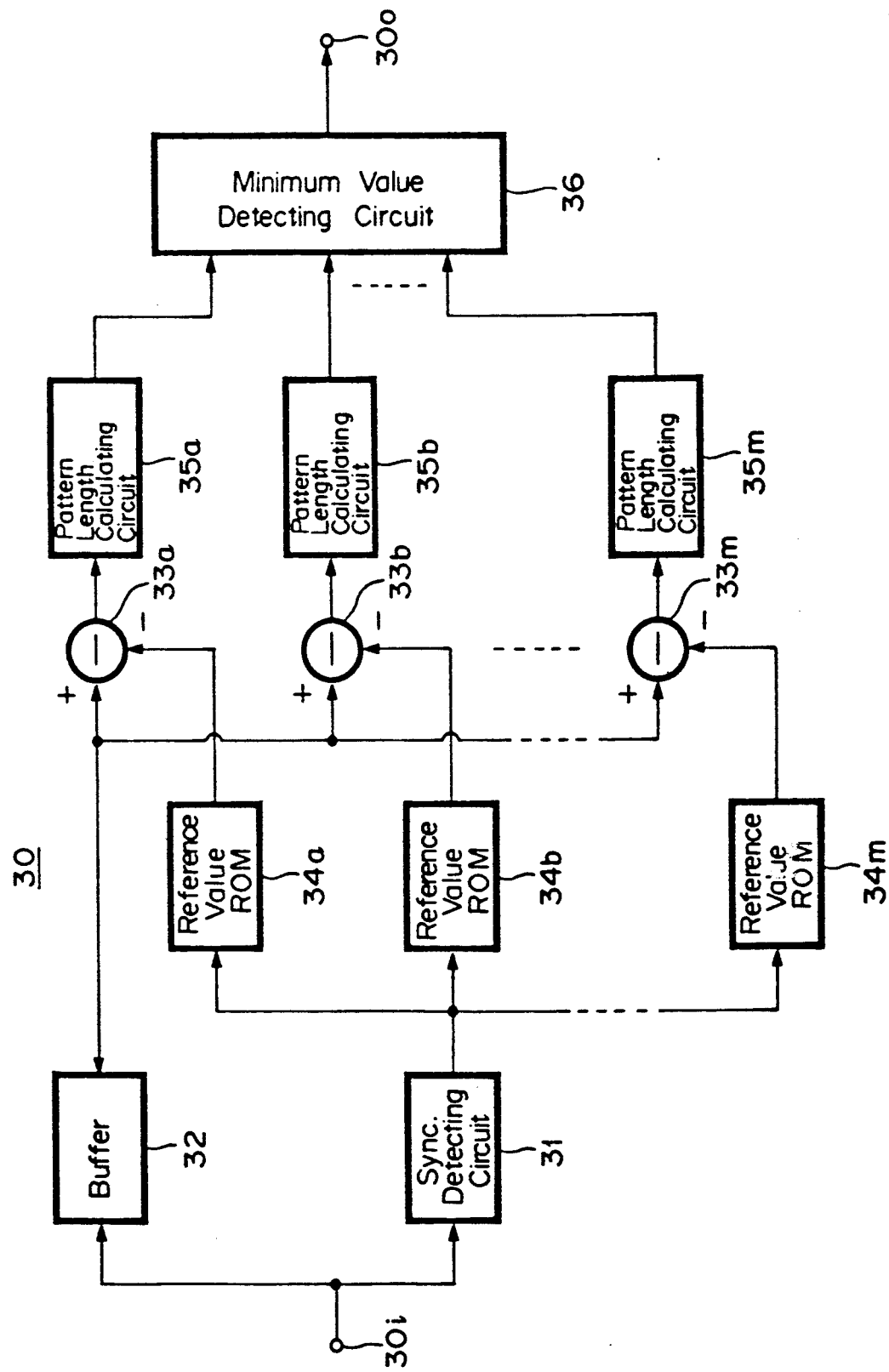

FIG. 10
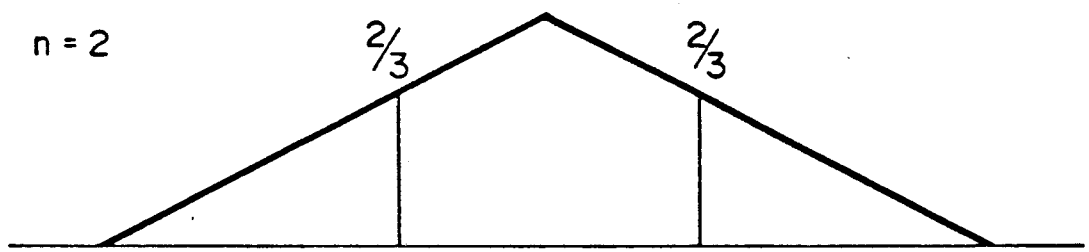
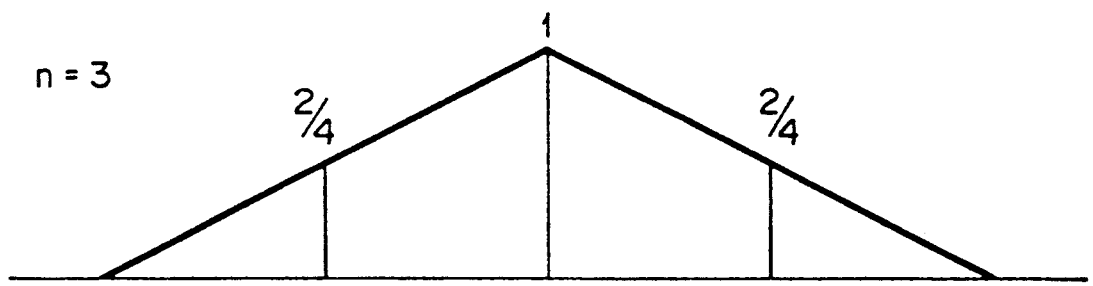
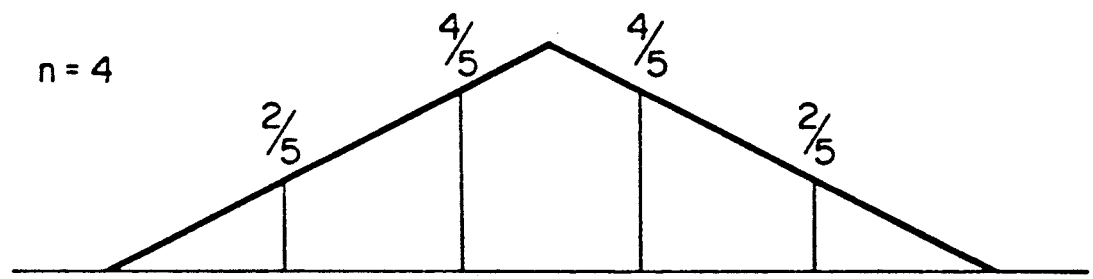
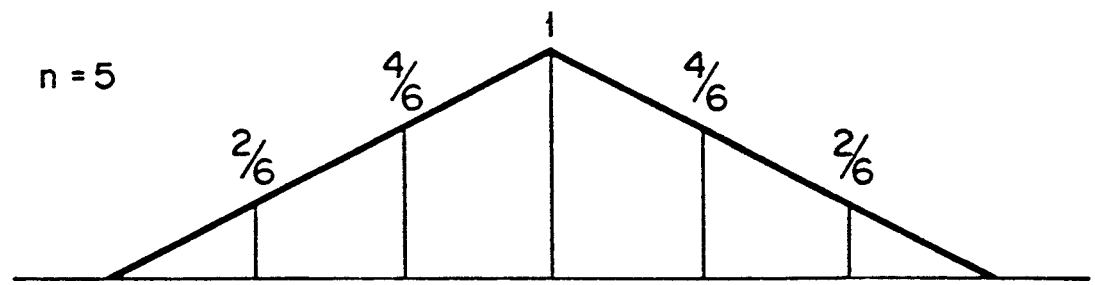

FIG. 21
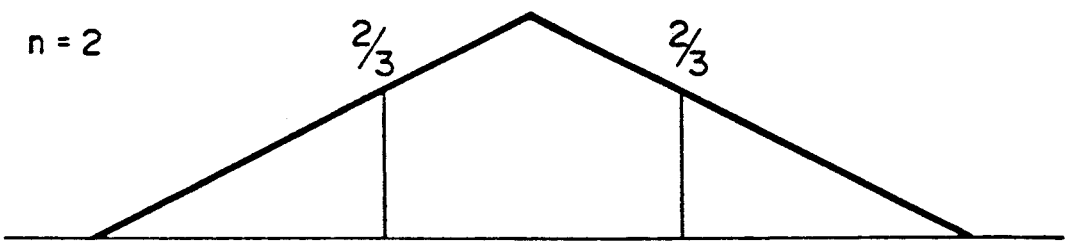
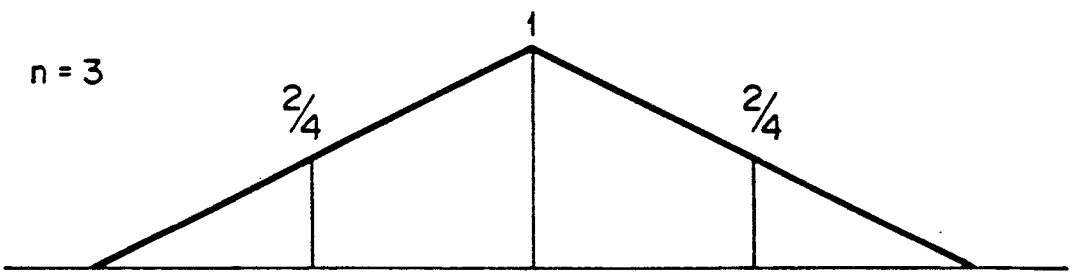
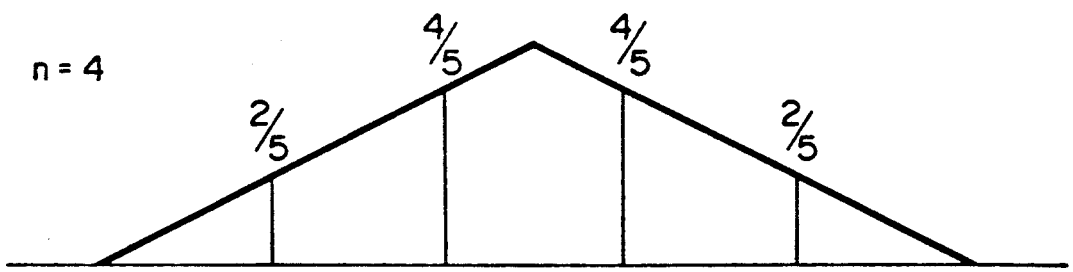
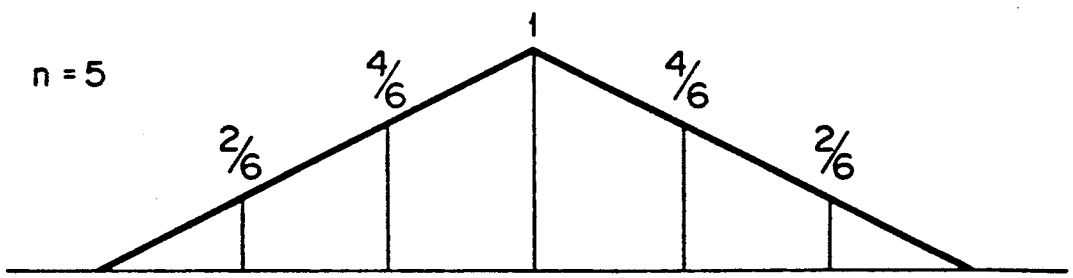

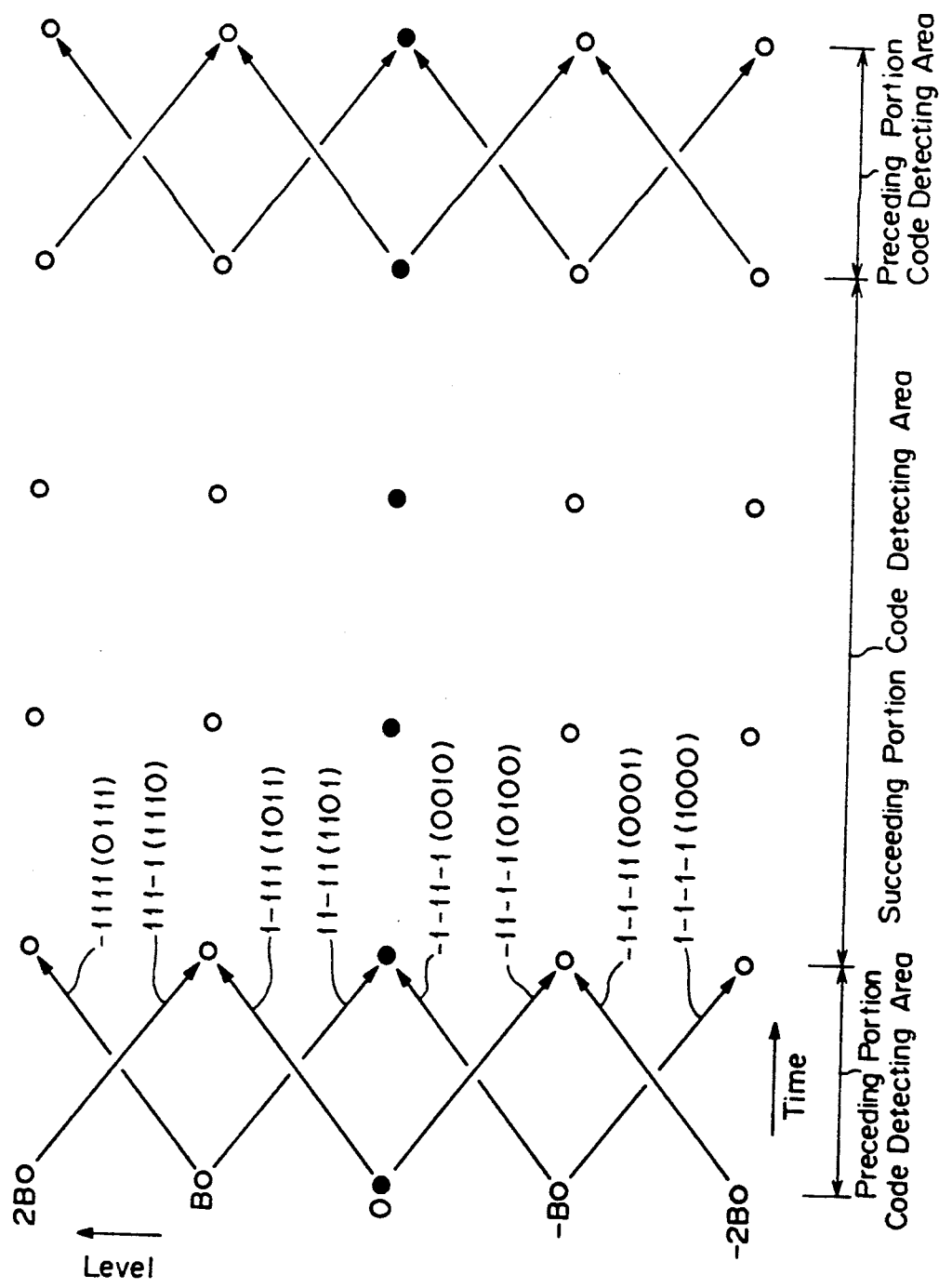

METHOD FOR CONVERTING AND/OR DETECTING DATA

BACKGROUND OF THE INVENTION

1. Field of the Invention

The present invention generally relates to a method for converting and/or detecting data and, more particularly, is directed to a method for converting and/or detecting data suitable for recording data at a high density.

2. Description of the Prior Art

Conventionally, in a digital signal magnetic recording and/or reproducing apparatus, binary values "1" and "0" of a digital signal are basically associated with the presence or absence of polarities of magnetization or inversion of magnetization. Further, in case of modulating (writing) a digital signal, the binary values are suitably associated with the magnetization in one bit unit by coding a recording signal in accordance with various modulation methods such as the non-return to zero (NRZ), frequency modulation (FM), modified frequency modulation (MFM) and group coded recording (GCR) (eight-to-ten conversion) etc., depending on physical characteristics of a recording medium and a transmission band of a system etc.

In case of demodulating (reading) the signal, the differential detection or integration detection is selectively used depending on the DC components of the modulated codes to thereby demodulate the data by detecting the signal in one bit unit.

In the above-described conventional digital signal recording and/or reproducing apparatus, it is premised that there is no inter-symbol interference and so a level of the reproduced signal is required to be sufficiently high in a high frequency band. Namely, a maximum repetition frequency and recording density of information are decided depending on a signal-to-noise ratio (S/N) of a high frequency band reproduced signal corresponding to a minimum magnetization inverting interval (Tmin) of the various modulation codes.

Thus, as shown in FIG. 1, a present maximum repetition frequency f max is set at a position where a high S/N ratio is obtained in a decreasing area of a reproducing level of a reproducing- level vs. frequency characteristics. In this decreasing area, a level of the reproduced signal decreases at a gradient of 12 dB/oct, for example, due to various losses in the recording and reproducing modes.

Further, an ideal transmission characteristics (frequency spectrum) as shown in FIG. 2A has been required and so such equivalent characteristics with a level decreasing area of a sine wave configuration satisfying the first criterion of Nyquist as shown in FIG. 2B has been utilized.

Now, in FIGS. 2A and 2B, a frequency fo corresponds to the minimum magnetization inverting inverval (T min).

The first criterion of Nyquist is such a condition that, when a signal wave is sampled at every constant period in a receiver side, sampled values other than the center point become 0.

In the eight-to-ten conversion, for example, utilized in a present digital audio tape recorder (DAT) etc., a relative speed between an application type metal tape (MT) and a magnetic head is slightly larger than 3 m/sec. and a maximum repetition frequency f max is set to be 4.7 MHz and further a gap length and a recording waveform are set to be 0.25 μm and 0.67 μm, respectively. In this case, a track pitch and a linear recording density will be about 10 to 15 μm and 60 to 80 kbpi at their limits, respectively.

Now, one way of increasing the recording density is to increase the maximum repetition frequency f max. However, if the maximum repetition frequency is increased to be twice as large as f max in order to double the recording density twice, for example, a level of the reproduced signal decreases at the frequency 2·f max when compared with that at f max as shown in FIG. 1 to degrade the S/N ratio remarkably, so that detection of the data becomes impossible.

Thus, the present magnetic recording and/or reproducing apparatus uses the recording medium and the signal conversion unit at their limits, so that it is quite difficult to decrease various losses at the recording and reproducing modes so as to improve a level of the reproduced signal at a high frequency band remarkably.

On the other hand, there occurs such a problem of inter-symbol interference in the reproduced waveform if the recording density is increased.

Namely, when there is one magnetization inversion isolatedly on the recording medium, a reproducing signal thereof will be a pulsative voltage waveform (isolated pulse) as shown in FIG. 3. This isolated pulse, that is, a waveform of an impulse response can be approximated to a Lorense type waveform represented by a following equation (1), for example, and the degree of spread of the waveform on a time axis (pulse width}is determined in accordance with the total transmission characteristics of the recording and reproducing system and the magnetic recording medium to be used. The pulse width is represented normally by a half width Wh at a level of 50 % of a peak level or a width Wb at a base level which is substantially 0 % of the peak level.

$$f(t) = 1/\{1 + (t/to)^2\} \quad (1)$$

If there are a plurality of magnetization inversions continuously at a constant space, as long as the recording density is low, there is no interference between adjacent pulses in a reproduction mode, so that the reproduction signal will be merely a sequence of alternations of inversed isolated pulses as described above.

If the recording density is increased to such a degree that an interval between adjacent pulses becomes a half of the pulse width Wb at the base level, end portions of the adjacent pulses overlap to each other as shown in FIG. 4 and so the waveform of the reproduced signal will be quite different from that of the isolated pulse.

However, as clear from FIG. 4, information as to peak values of the respective pulses in this state can be maintained without being distorted and so there occurs no inter-symbol interference regardless of the existence of interferences between the pulses.

If the recording density is increased much more than that of FIG. 4, a peak value of the reproduced signal decreases and a non-linear inter-symbol interference (peak shift) where an interval between the peak positions becomes larger will be generated.

Further, if the recording density is more increased to such a degree that an interval of the adjacent pulses becomes one fourth of the pulse width Wb at the base level as shown in FIG. 5, for example, the reproduced waveform of the pulses will be similar to a sine waveform and a peak value is remarkably decreased, and further there occurs the inter-symbol interference which degrades information of peak values of the respective pulses.

By the way, the partial response system (PR system) has been known as a method of using the inter-symbol interference.

This partial response method limits the frequency spectrum within the Nyquist band width as shown in FIG. 6, for example, by suitably constructing codes to thereby require no high-frequency component advantageously.

The transmission characteristics of FIG. 6 corresponds to a class 4 of the partial response (modified duo binary) and can be represented by a following equation (2).

$$Pr(1, 0, -1) = \sin(2\pi f/f_0) \quad (2)$$

However, since the above-described various modification codes are prepared without taking into consideration the inter-symbol interference, the above-described advantages of the partial response method could not been satisfactorily obtained even if the method is applied to the data conversion and detecting method.

Further, a maximum magnetization transition interval (Tmax) becomes infinite in some of the modulation codes, so that such functions required in the system as the overwriting and the clock reproduction could not have been realized disadvantageously regardless of the application of the partial response method.

OBJECTS AND SUMMARY OF THE INVENTION

Accordingly, it is a general object of the present invention to provide an improved method for converting and/or detecting data in which the aforementioned shortcomings and disadvantages of the prior art can be eliminated.

More specifically, it is an object of the present invention to provide an improved method for converting and/or detecting data which is capable of decreasing the error ratio in the reproducing mode and improving the recording density while utilizing a present recording medium and a recording and/or reproducing unit.

According to an aspect of the present invention, a data conversion method of converting source data of M bit unit to be recorded on a recording medium into conversion data of N (N is an integer larger than M) bit unit is provided, wherein n (which is a number of inter-symbol interferences permitted in a transmission path) continuous codes in the codes of the conversion data are weighted by weighting coefficients with a weighting distribution decreasing linearly from a distribution center, the weighted n continuous codes are sequentially added to form intermediate series, and then such conversion data that a sum (modulation code length) of absolute values of differences of each of the same order codes between the intermediate series is not less than a predetermined number of times as large as a reference value of the weighting coefficient is selected as a modulation code.

By this method, a pattern length between the code patterns can be made larger to thereby improve the recording density remarkably while using the present recording medium and recording and/or reproducing apparatus.

Further, according to a data detecting method of the present invention, a pattern of a reproduced signal corresponding to data to be detected is compared with code patterns corresponding to respective conversion data to thereby select one pattern which is most similar to the code patterns, whereby the conversion data recorded by a remarkably high density can be surely detected with using the present recording medium and recording and/or reproducing apparatus.

The above and other objects, features, and advantages of the present invention will become apparent from the following detailed description of illustrative embodiments thereof to be read in conjunction with the accompanying drawings, in which like reference numerals represent the same or similar objects.

BRIEF DESCRIPTION OF THE DRAWINGS

FIG. 7 is a block diagram illustrating general constructions of a magnetic recording and/or reproducing system embodying a data conversion and/or detecting method according to the present invention;

FIG. 8 is a block diagram illustrating a main section of the embodiment of this invention;

FIG. 10 is a diagram illustrating distributions of weighting coefficients for explaining the operation of the embodiment of the invention;

FIG. 21 is a diagram illustrating distributions of weighting coefficients for explaining the operation of the still another embodiment;

FIG. 29 is a diagram illustrating reproduced output for explaining the operation of the further embodiment.

DETAILED DESCRIPTION OF THE PREFERRED EMBODIMENTS

Figure 1:
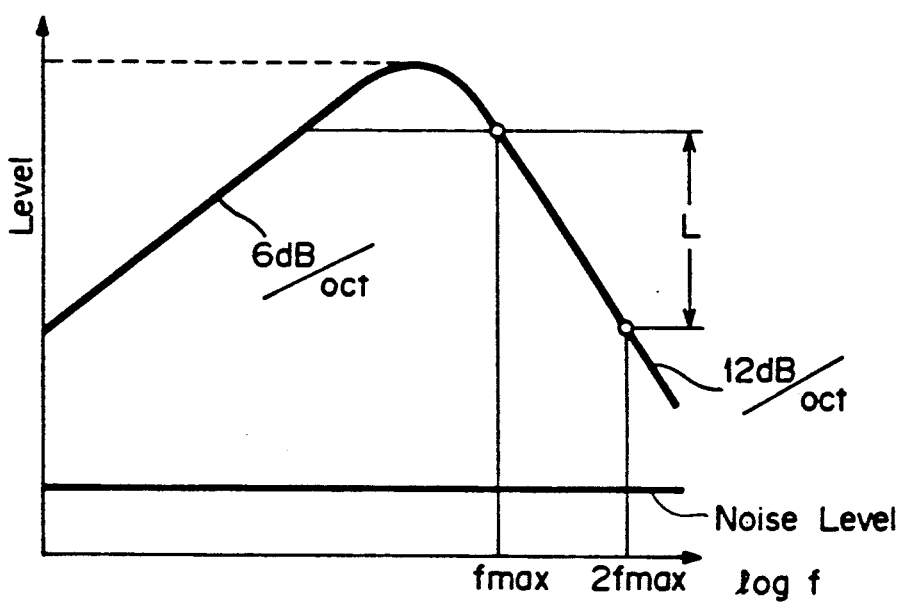
FIG. 1 is a diagram explaining reproduction characteristics of conventional digital magnetic recording and/or reproducing apparatus.
Figure 2A:
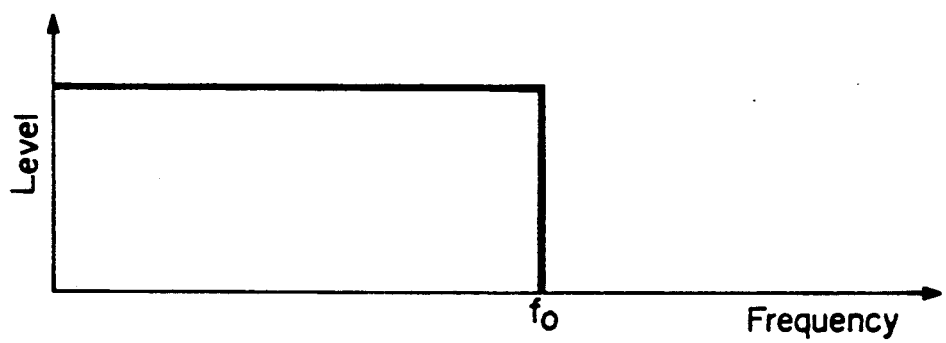
FIGS. 2A and 2B are diagrams illustrating transmission characteristics of the conventional apparatus.
Figure 2B:
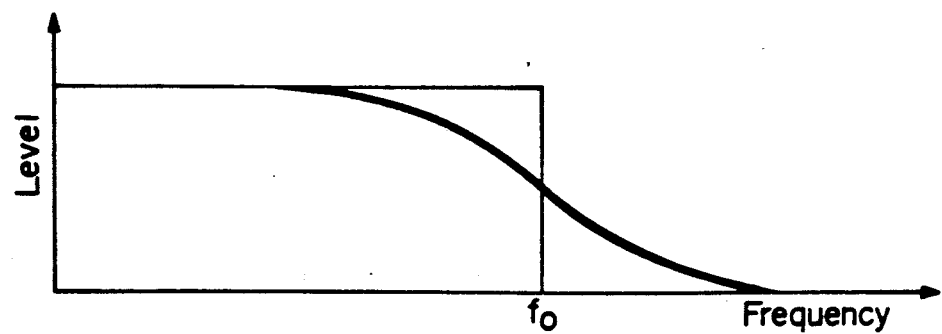
Figure 3:
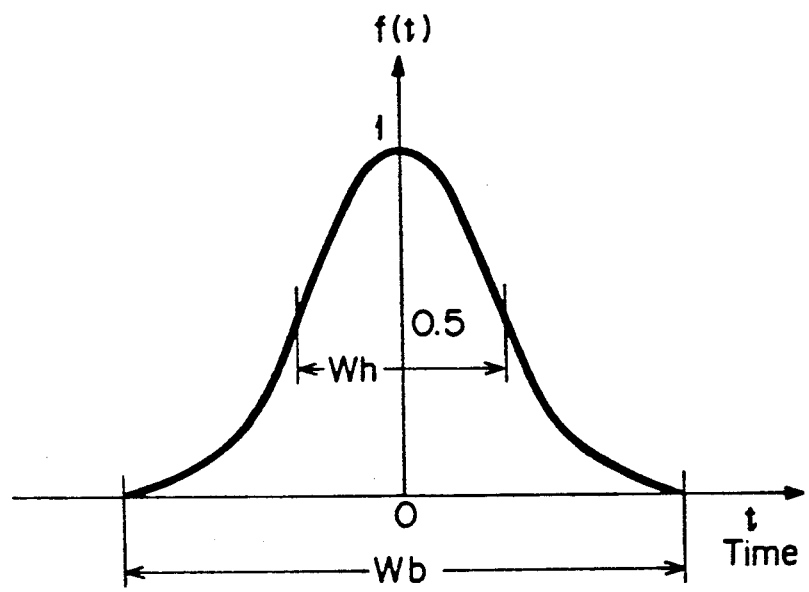
FIGS. 3 to 5 are diagrams illustrating waveforms of the conventional apparatus.
Figure 4:
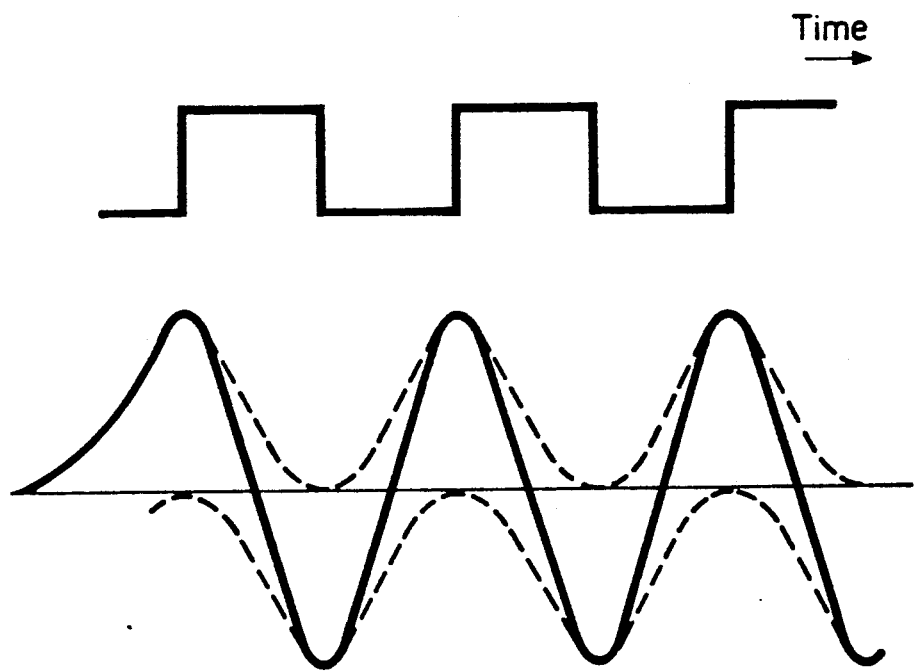
Figure 5:
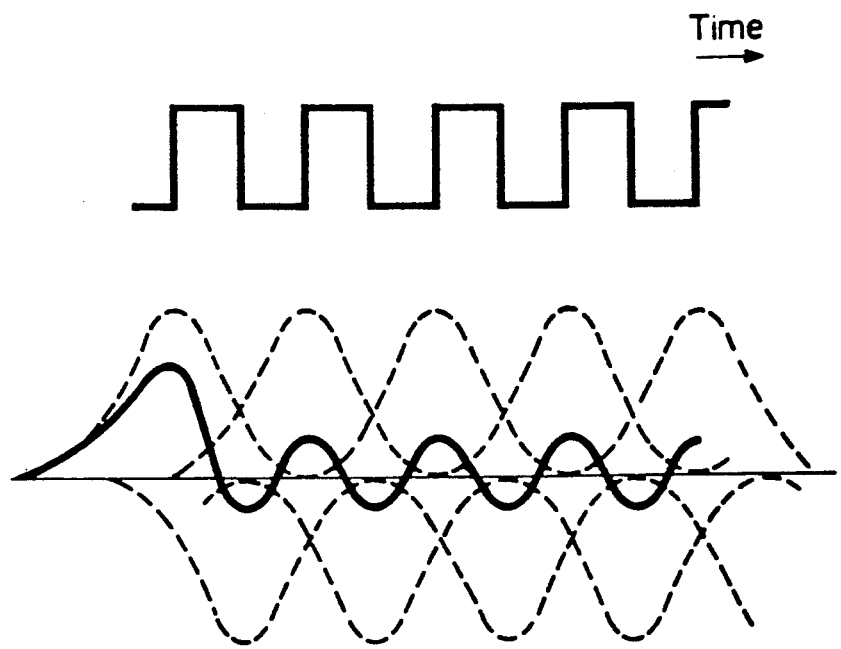
Figure 6:
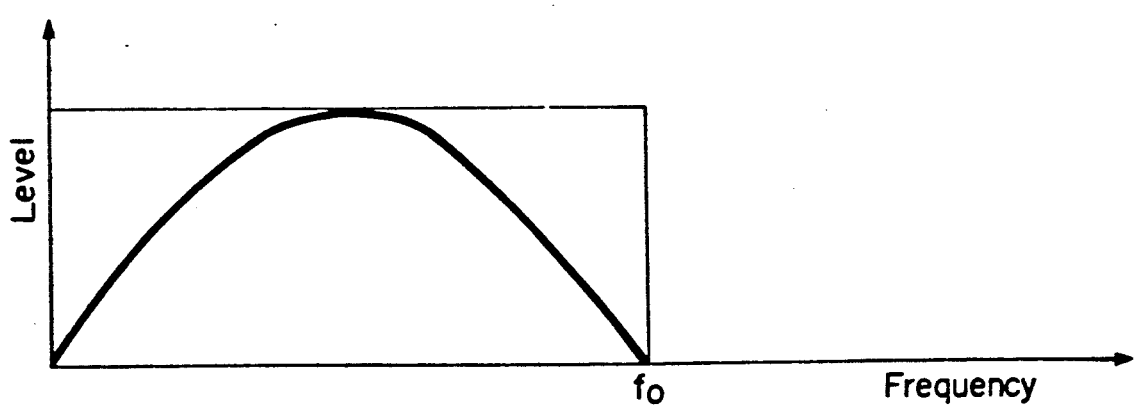
FIG. 6 is a diagram illustrating transmission characteristics of another example of the conventional apparatus.
Figure 9A:
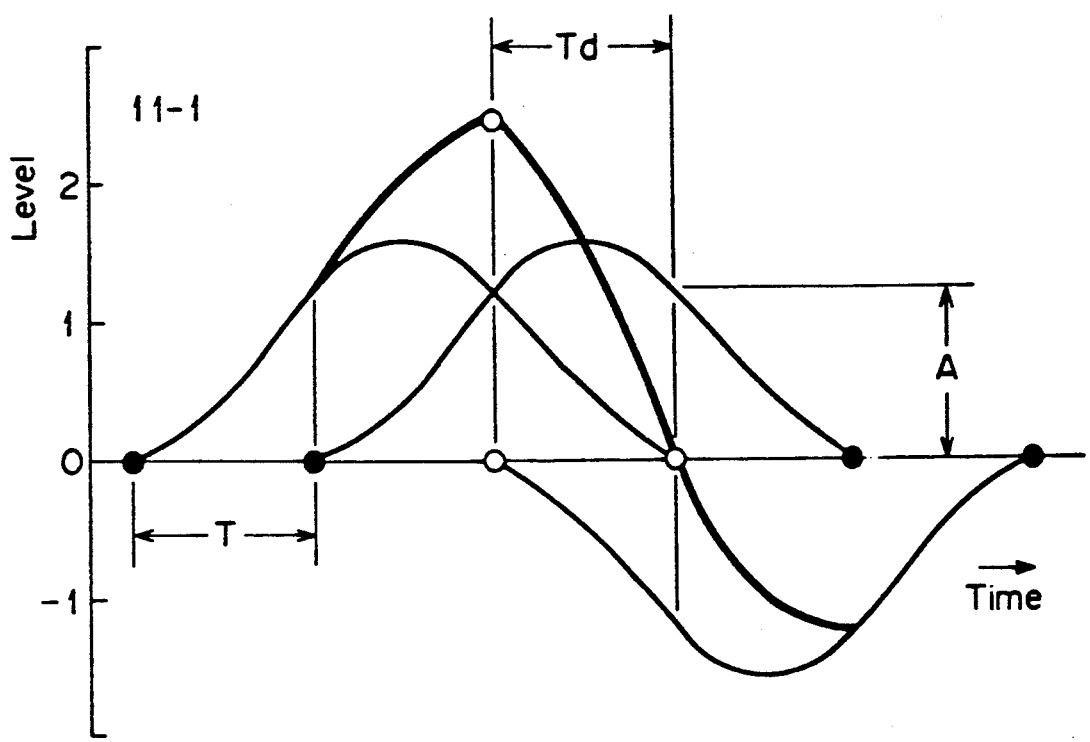
FIG. 9, consisting of FIGS. 9A and 9B, is a diagram illustrating reproduced waveforms for explaining the operation of the embodiment of this invention.
Figure 9B:
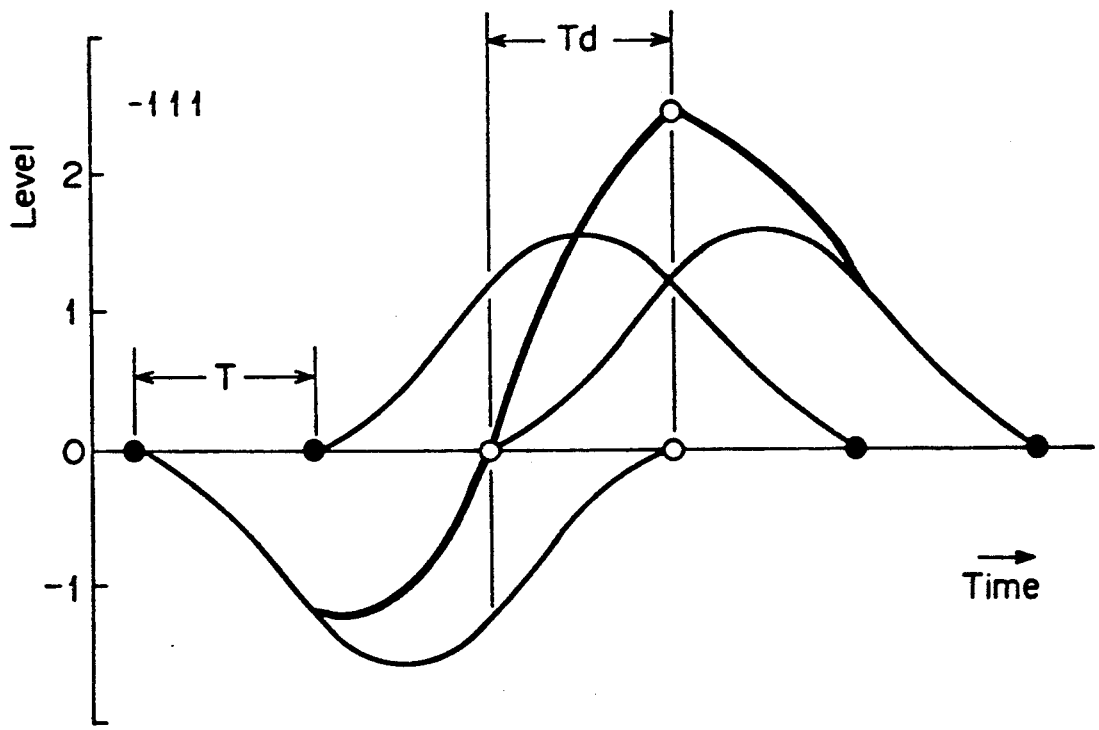
Figure 9C:
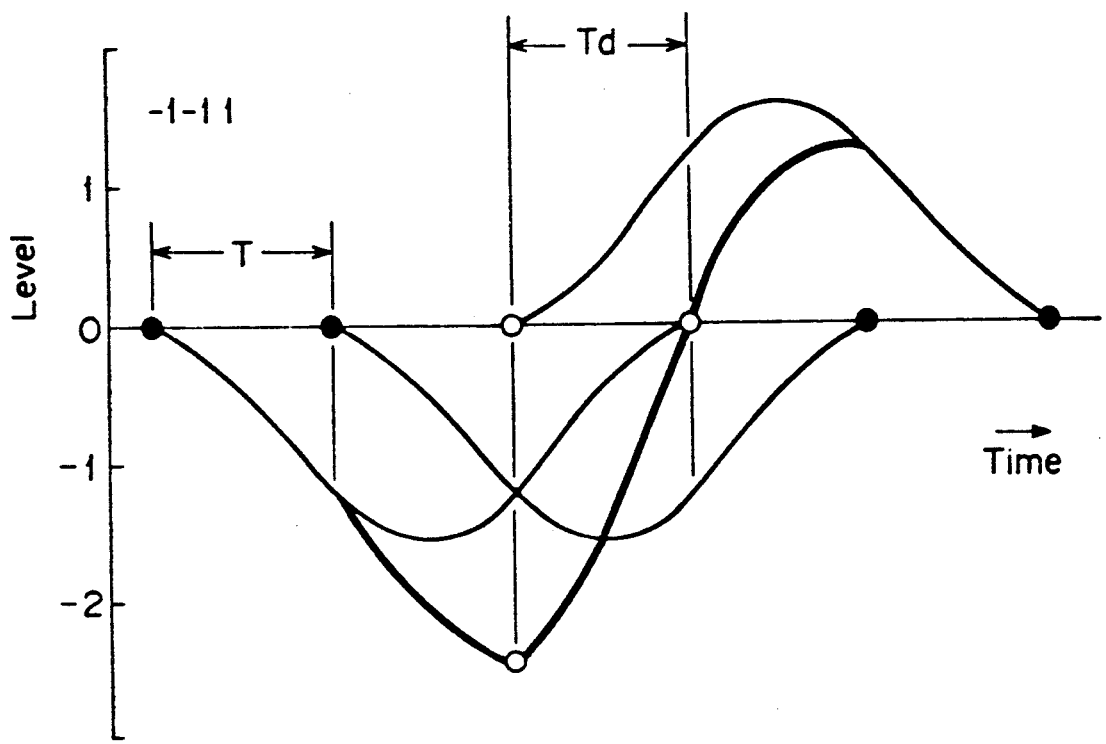
Figure 9D:
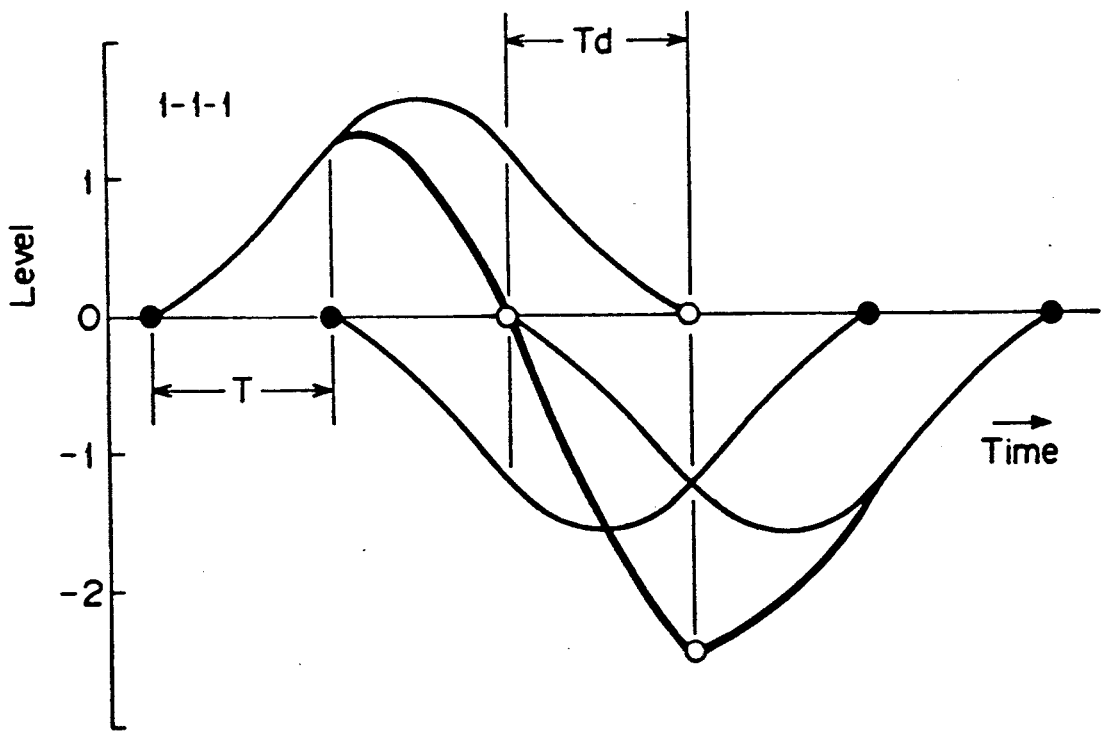

Preferred embodiments of the present invention will now be described by way of example and with reference to the accompanying drawings.

At first, a method for converting and/or detecting data according to an embodiment of the present invention will now be described with reference to FIGS. 7 to 13.

FIG. 7 is a block diagram illustrating general configuration of a magnetic recording and/or reproducing system to which an embodiment of the present invention is applied, and FIG. 8 is a block diagram illustrating a main portion of the system of FIG. 7.

Referring now to FIG. 7, in a recording system 10, an analog signal such as an audio signal or a video signal etc. applied to an input terminal IN is supplied through an analog-to-digital (A/D) converter 11 to a data generation circuit 12 which in turn generates recording data accorded with a system format. A data conversion circuit 13 has a read only memory (ROM) table where conversion codes as shown in Table 1 described later are stored. An output of the data generation circuit 12 is applied to the data conversion circuit 13 having a ROM and symbol data outputted from the conversion circuit 13 is applied to a magnetic head 1 through a recording amplifier 14 to be recorded directly on a magnetic tape MT.

In a reproducing system 20, a signal with a differentiated waveform reproduced by a magnetic head 2 from the magnetic tape MT is supplied through a reproduction amplifier 21 to a waveform equalizing circuit 22 composed of an integrator and a low pass filter. An output of the waveform equalizing circuit 22 is applied on one hand to an analog-to-digital (A/D) converter 23 to be converted into data of 8 bits, for example, and also applied on the other hand to a phase locked loop (PLL) circuit 24 whose output is applied to the A/D converter 23 as a synchronous signal.

An output of the A/D converter 23 is applied to a data detecting circuit 30 which in turn detects the symbol data and applies it to a decoding circuit 25. The decoding circuit 25 decodes the symbol data into a source data to apply it to an output terminal OUT.

Detailed constructions of the data detecting circuit 30 will be described later.

Referring to FIG. 8, a series of pattern data is applied from an input terminal 30i of the data detecting circuit 30 on one hand directly to a synchronous detecting circuit 31 and on the other hand to a plurality of subtracters 33a to 33m commonly through a buffer 32. An output of the synchronous detecting circuit 31 is commonly applied to reference value read only memories (ROM) 34a to 34m whose outputs are applied to corresponding subtracters 33a to 33m, respectively. The ROMs 34a to 34m store waveform values of code patterns selected as reference values, respectively.

The outputs of the subtracters 33a to 33m are respectively applied to pattern length calculation circuits 35a to 35m whose outputs are applied to a minimum value selecting circuit 36 to thereby apply one pattern data having a minimum length from the waveform values of the respective code patterns to an output terminal 30o.

The code pattern and the pattern length will be explained later.

Next, an operation of this embodiment of the present invention will be explained with reference to FIGS. 9 to 13.

In this embodiment, a relation between a maximum recording repetition frequency fo and a pulse width Wb of an isolated pulse at a base level is set as shown by a following equation (3)

$$Wb = \tfrac{3}{2} \cdot fo \qquad (3)$$

Thus, the pulse width Wb is equal to three times as large as a sampling period and so two sampling points are included within the pulse width Wb of each isolated pulse as shown in FIG. 9.

In this application, this state will be called as a state where two inter-symbol interferences can be permitted, and also a state where n sampling points are included within the pulse width Wb of each isolated pulse will be called as a state where n inter-symbol interferences can be permitted.

In this embodiment, the data conversion circuit (ROM) 13 of the recording system 10 converts a source (original) data of 2 bit unit into a conversion data (modulation code) of 3 bit unit, that is, performs the two-to-three conversion as shown in a following Table 1.

TABLE 1

| Source data | Conversion data | Intermediate series | |
|---|---|---|---|
| 0 0 | −1 −1  1 | −4/3 | 0 |
| 0 1 | −1  1  1 | 0 | 4/3 |
| 1 0 |  1 −1 −1 | 0 | −4/3 |
| 1 1 |  1  1 −1 | 4/3 | 0 |

In the conversion data of the table 1, each "0" of four data patterns "001", "011", "100" and "110" of normal eight data patterns is replaced by "−1".

The intermediate series of the table 1 is formed by combining three values [$\tfrac{4}{3}$], [0] and [$-\tfrac{4}{3}$] in different manners and it is formed as follows.

At first, the number of inter-symbol interferences permitted depending on the characteristics of a transmission line is set to be n and weighting coefficients w distributed so as to decreased linearly from the center are provided as shown in FIG. 10 and a following Table 2.

TABLE 2

| Number of interferences (n) | Weighting coefficients (w) | | | | |
| --- | --- | --- | --- | --- | --- |
| 2 | | | 2/3 | 2/3 | |
| 3 | | 2/4 | 4/4 | 2/4 | |
| 4 | 2/5 | 4/5 | 4/5 | 2/5 | |
| 5 | 2/6 | 4/6 | 6/6 | 4/6 | 2/6 |
| . | | | | | |
| . | | | | | |
| ne (even) | $\frac{2}{n+1}\cdots\frac{n-2}{n+1}$ | $\frac{n}{n+1}$ | $\frac{n}{n+1}$ | $\frac{n-2}{n+1}\cdots\frac{2}{n+1}$ | |
| no (odd) | $\frac{2}{n+1}\cdots\frac{n-1}{n+1}$ | $\frac{n+1}{n+1}$ | $\frac{n-1}{n+1}\cdots\frac{2}{n+1}$ | | |

Next, respective n continuous codes of each set of the conversion codes of N codes in the table 1 are weighted by using the weighting coefficients.

Namely, supposing that codes of i-th conversion codes in the table 1 are ai1, ai2 and ai3 and that weighting coefficients in the table 2 when two inter-symbol interferences are permitted are w21 and w22 (w21=w22), each of two sets of continuous codes ai1, ai2 and ai2, ai3 are weighted to obtain following two sets of values.

[w21·ai1 ; w22·ai2]

[w21·ai2 ; w22·ai3]

Thus, weighted two codes in each of the two sets of continuous codes are added as shown in following equation (5) to thereby form first and second codes Ui1 and Ui2 of the i-th intermediate series.

$$\left.\begin{array}{l}Ui1 = w21 \cdot ai1 + w22 \cdot ai2 \\ Ui2 = w21 \cdot ai2 + w22 \cdot ai3\end{array}\right\} \quad (5)$$

Similarly, first and second codes Uj1 and Uj2 of a j-th intermediate series can be formed as shown in following equations (6).

$$\left.\begin{array}{l}Uj1 = w21 \cdot aj1 + w22 \cdot aj2 \\ Uj2 = w21 \cdot aj2 + w22 \cdot aj3\end{array}\right\} \quad (6)$$

The intermediate series are different from one another as clear from the table 1, and a code length Vij representing a degree of non-analogy between a pair of the intermediate series Ui and Uj can be defined by the equation (7) as a sum of absolute values of differences between respective k-th codes of a pair of the intermediate series Ui and Uj.

$$Vij = |Ui1 - Uj1| + |Ui2 - Uj2| = \Sigma_k |Uik - Ujk| \quad (7)$$

In this embodiment, conversion data wherein the code length Vij is more than twice as large as a reference value of the weighting is selected as a modulation code. The reference value corresponds to the peak value of an impulse response in accordance with the total transmission characteristics of the recording system 10 and the reproducing system 20.

Figure 11:
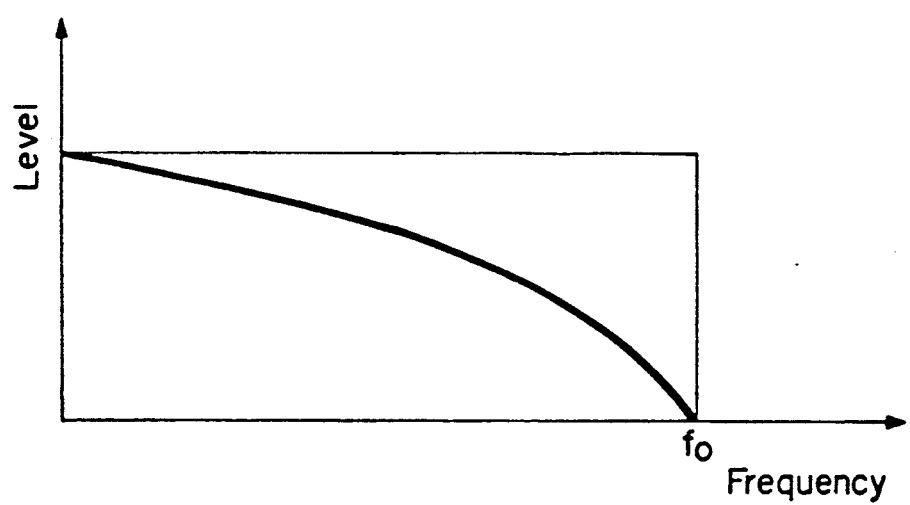
FIG. 11 is a diagram illustrating transmission characteristics of another main section of the embodiment of the invention.

In the reproducing system 20, the equalizing characteristics of the waveform equalizing circuit 22 are selected to have ones shown in a following equation (8) and FIG. 11 corresponding to a class 1 of a partial response so as to correspond to two inter-symbol interferences.

$$Pr(1,1) = \cos(\pi f/fo) \quad (8)$$

Thus, a level number of the reproducing signal at an output of the waveform equalizing circuit 22 will be 3, as well known. Further, reproducing waves (code patterns) peculiar to the data pattern of each of the respective conversion data in the table 1 can be obtained as shown in FIG. 9. This code pattern takes three values [2A], [0] and [−2A] at two sampling points within a detecting period Td where three isolated pulses commonly exist, where A represents a level of an isolated pulse at a sampling point.

A pattern length Dpq representing a degree of non-analogy between the code patterns P, Q . . . is given by $$Dpq = \Sigma_k |Spk - Sqk| \quad (9)$$

where Spk and Sqk represent reproduced output levels at sampling points corresponding to respective k-th codes of the pair of the code patterns P and Q, respectively.

In this embodiment, by utilizing the waveform equalizing characteristics shown in FIG. 11 and the equation (8), the pattern length Dpq between the code patterns P, Q . . . respectively corresponding to the conversion data of the table 1 will be more than twice as large as a peak value of the impulse response in a transmission path composed of the recording system 10 and the reproducing system 20.

The waveforms of the impulse response have concave configurations where positive peak levels exist at both sides of a center line as shown in FIG. 9 etc., so that the pattern length Dpq of the equation (9) will be larger than the code length Vij of the equation (7) calculated based on the weighting coefficients with a linear distribution shown in FIG. 10.

In the data detecting circuit 30 in FIG. 8, the code patterns respectively corresponding to the above-described conversion data are selected as the reference values and then stored into the reference value ROMs 4a to 34m, respectively. The subtracters 33a to 33m compare m (=4) code pattern data stored in the ROMs 34a to 34m with input pattern data of 3 bit unit applied from the buffer 32, respectively. The pattern length calculation circuits 35a to 35m calculate the pattern lengths between the input pattern and the respective code patterns in accordance with the equation (9) based on the results of the comparison from the subtracters 33a to 33m, respectively.

The minimum value selecting circuit 36 selects, among outputs of the pattern length calculation circuits 35a to 35m, one pattern data having a minimum length Dmin from any one of the m code patterns to thereby apply it to the output terminal 30o as a maximum likelihood detecting data.

As described above, this embodiment utilizes the vector coding for the data conversion and detection.

Figure 12:
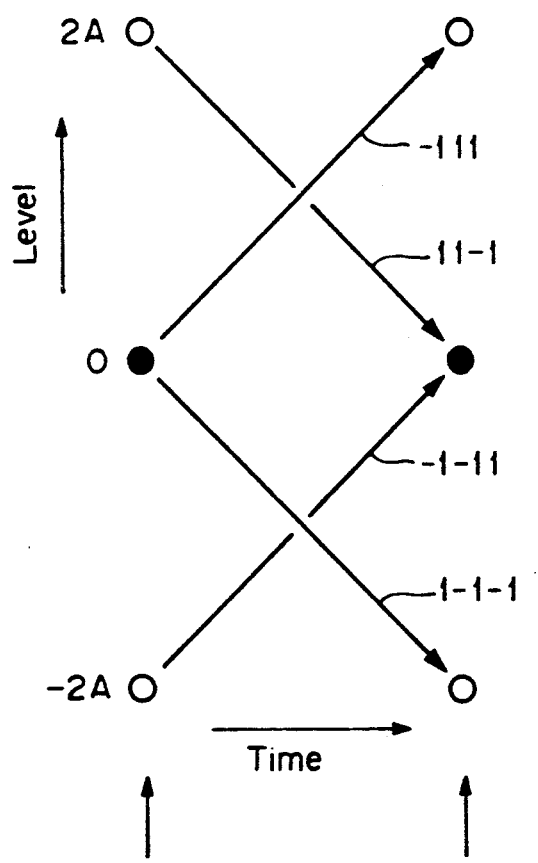
FIG. 12 is a diagram illustrating a reproduced output for explaining the operation of the embodiment.

Now, the above described reproduced output waveforms with three values can also be represented as shown in FIG. 12 by which correspondence between the intermediate series in the table 1 and the reproduced waveforms will be immediately grasped. Namely, it is clearly understood that a first bit [−4/3] of the intermediate series of the first conversion data "−1 −1 +1" corresponds to the reproduced output level [−2A] at a preceding sampling point and that a succeeding bit [0] corresponds to the reproduced output level [0] at a succeeding sampling point.

In this case, the reproducing system 20 can be synchronized on the basis of zero cross points of the reproduced waveform shown by black dot points in FIG. 12.

Figure 13:
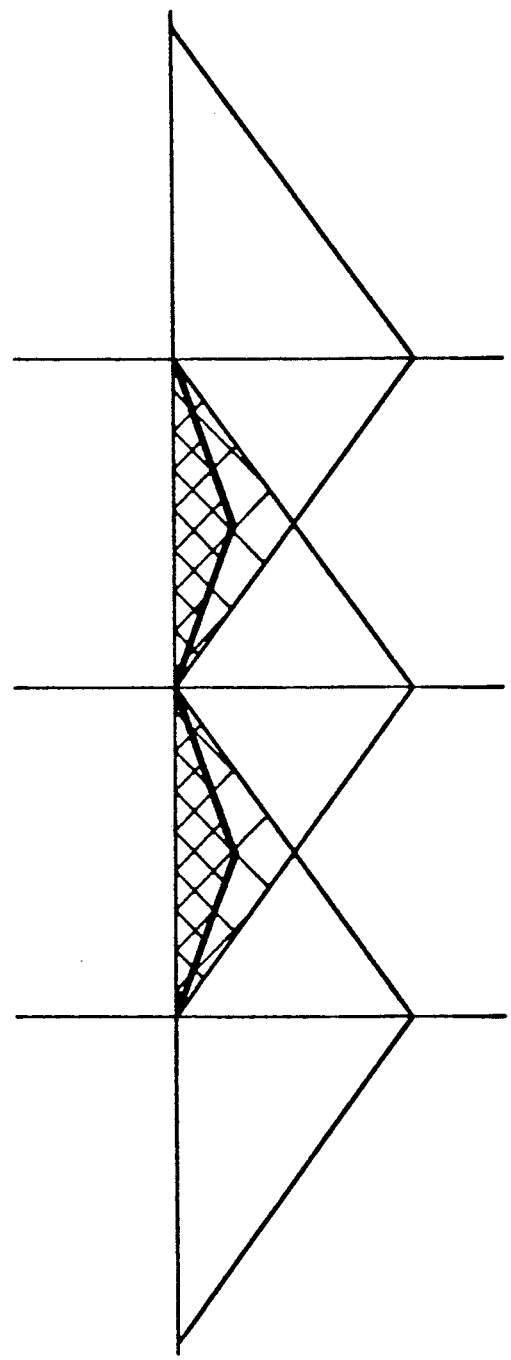
FIG. 13 is a diagram illustrating noise distribution and detection error for explaining the operation of the embodiment.
Figure 14A:
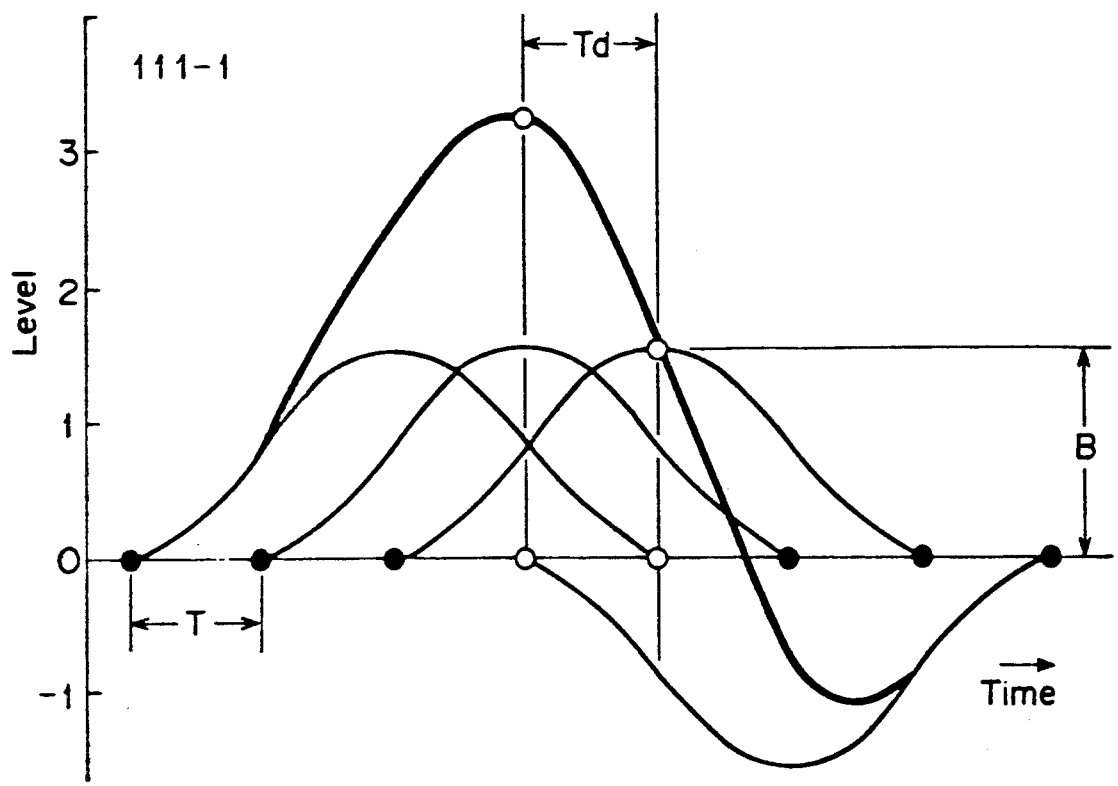
FIG. 14, consisting of FIGS. 14A, 14B, 14C and 14D, is a diagram illustrating reproduced waveforms for explaining the operation of another embodiment of this invention.
Figure 14B:
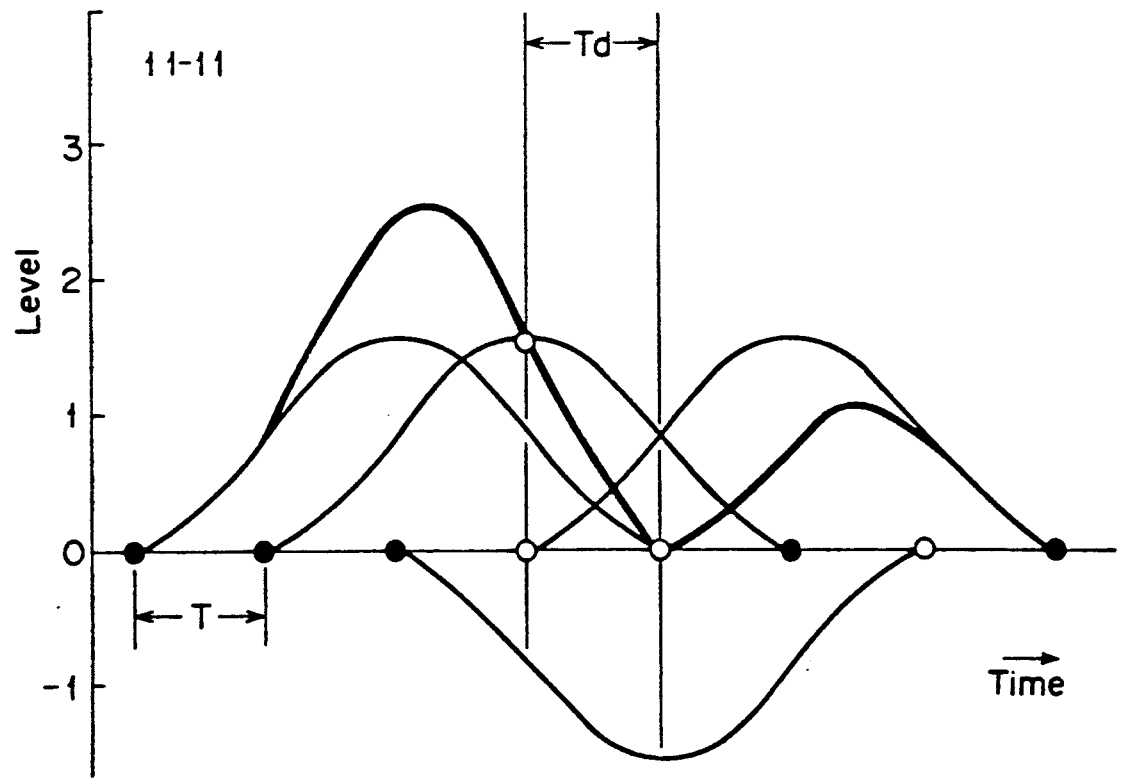
Figure 14C:
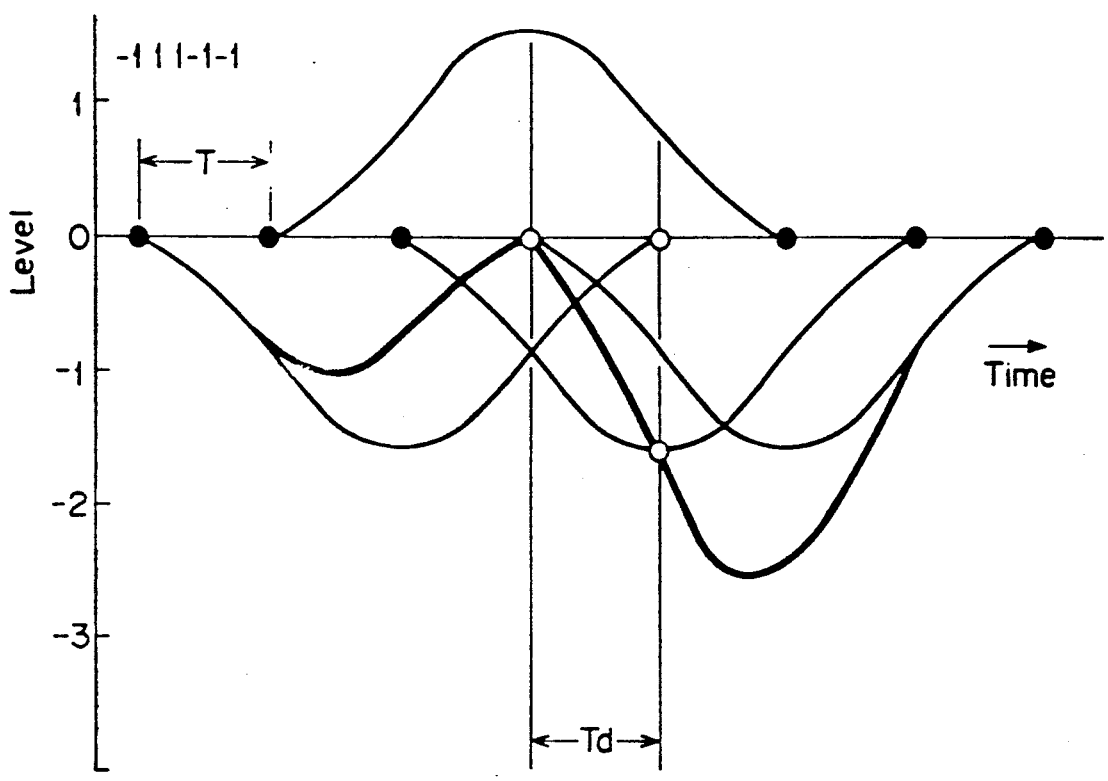
Figure 14D:
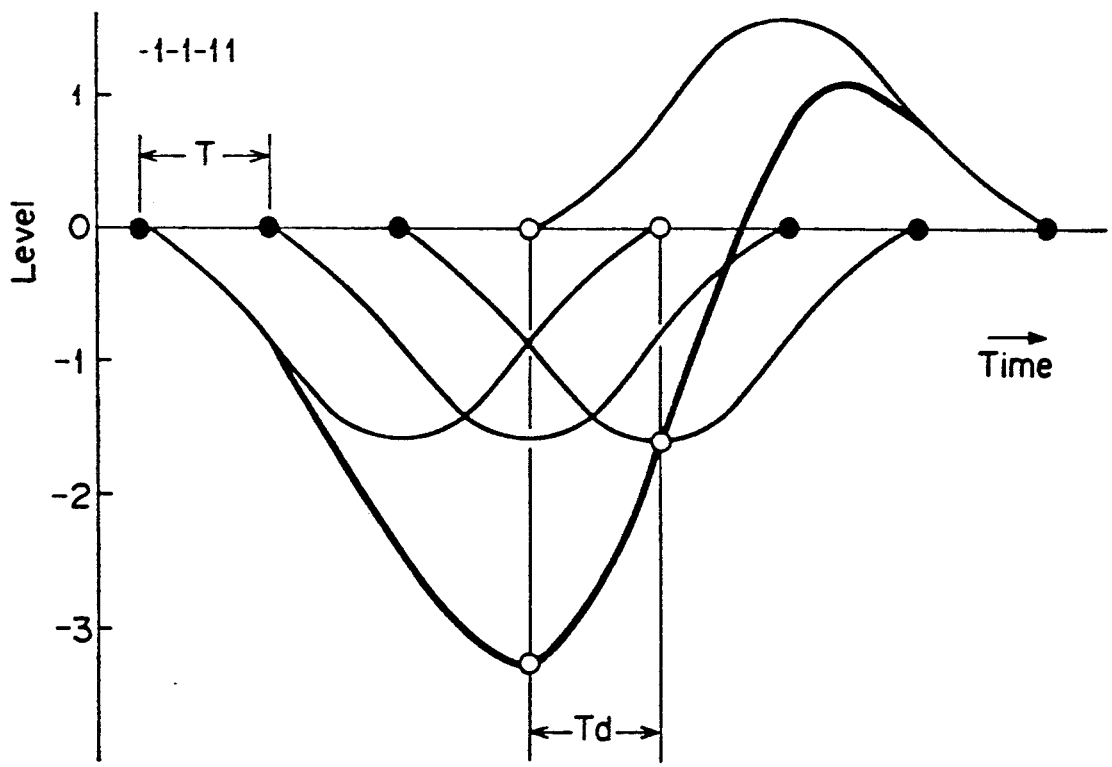

Since this embodiment performs the above-described maximum likelihood detection, error rate due to the noise distribution characteristics linearly decreasing from the three output levels [2A], [0] and [−2A] of FIG. 11 as the center will be product of overlapped portions of the noise distribution characteristics which corresponds to an area of finely hatched portions in FIG. 13.

On the other hand, when the three level value detection is performed, error rate due to the noise distribution characteristics respectively having three output levels as center points of FIG. 12 corresponds to an area shown by finely and roughly hatched portions in FIG. 13 where respective noise distribution characteristics are overlapped.

Accordingly, the data detecting method of this embodiment can improve noise-proof characteristics when compared with the simple three level value detection method.

In the above-described embodiment, four conversion data of three bit unit are established or decided from a source data of two bit unit in the data conversion mode, and, in the reproducing mode, the reproducing signal patterns subjected to the waveform equalization by characteristics permitting two inter-symbol interferences are compared with the code pattern group corresponding to the respective conversion data to thereby select one pattern similar to the code patterns to detect the data, so that the recording density can be improved remarkably.

Figure 15:
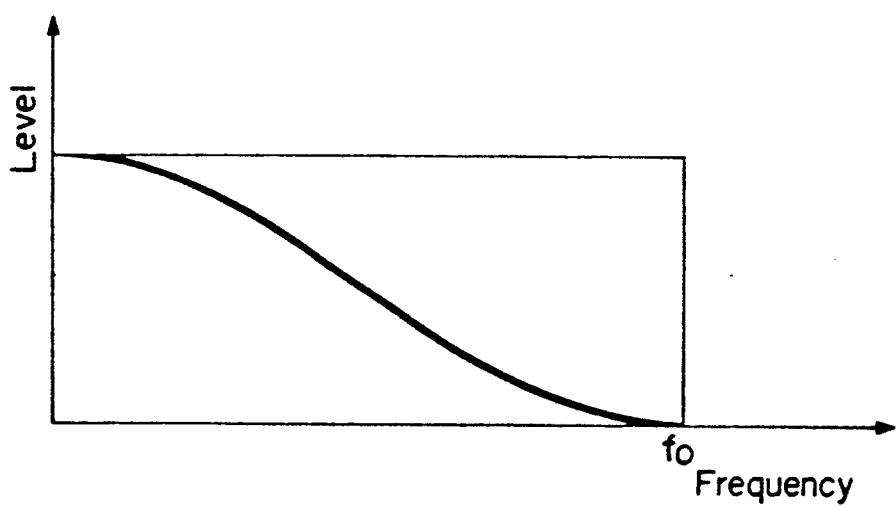
FIG. 15 is a diagram illustrating transmission characteristics of a main section of the another embodiment.

Next, a method of converting and/or detecting data according to another embodiment of the present invention will be described with reference to FIGS. 14 to 16.

A recording and/or reproducing system to which this another embodiment is applied is similar in the constructions thereof to those shown in FIGS. 7 and 8, so that drawings and explanations thereof will be omitted so as to simplify the explanation.

The operation of the another embodiment will be explained below.

In this embodiment, a relation between the maximum recording repetition frequency fo and the pulse width Wb of an isolated pulse is set as shown in the following equation (10)

$$Wb = \tfrac{3}{2} \cdot fo \quad (10)$$

Thus, as shown in FIG. 14 the pulse width Wb is four times as large as the sampling period and so three sampling points are included within the pulse width Wb of each isolated pulse, which is a state where three inter-symbol interferences are permitted.

Further, in this embodiment, the data conversion circuit (ROM) 13 of the recording system 10 performs the three-to-four conversion where the source data of three bit unit is converted into the conversion data (modulation code) of four bit unit as shown in the following Table 3.

TABLE 3

| Source data | Conversion data | Intermediate series |
|---|---|---|
| 0 0 0 | 1  1  1 −1 | 2  1 |

TABLE 3-continued

| Source data | Conversion data | Intermediate series |
|---|---|---|
| 0 0 1 | −1  1  1  1 | 1  2 |
| 0 1 0 | 1  1 −1  1 | 1  0 |
| 0 1 1 | 1 −1  1  1 | 0  1 |
| 1 0 0 | −1  1 −1 −1 | 0 −1 |
| 1 0 1 | −1 −1  1 −1 | −1  0 |
| 1 1 0 | 1 −1 −1 −1 | −1 −2 |
| 1 1 1 | −1 −1 −1  1 | −2 −1 |

In the conversion data of the table 3, each "0" of eight data patterns "1110", "0111", "1101", "1011", "0100", "0010", "1000" and "0001" of normal data patterns is replaced with "−1".

The intermediate series of the table 3 is formed by combining five values [2], [1], [0], [−1] and [−2] in different manners and it is formed as follow in the same manner as described above.

At first, continuous three codes of each set of four codes bi1 to bi4 and bj1 to bj4 of the i-th and j-th conversion codes in the table 3 are weighted by using the weighting coefficients w31, w32 and w33 (w31=w33) shown in the table 2 and FIG. 10.

Next, the weighted continuous three codes of the each set are added in a manner shown in a following equation (11) to thereby form first and second codes Ui1, Ui2 and Uj1, Uj2 of i-th and j-th intermediate series in the table 3, respectively.

$$\left.\begin{aligned}
Ui1 &= w31\,bi1 + w32\,bi2 + w33\,bi3 \\
Ui2 &= w31\,bi2 + w32\,bi3 + w33\,bi4 \\
Uj1 &= w31\,bj1 + w32\,bj2 + w33\,bj3 \\
Uj2 &= w31\,bj2 + w32\,bj3 + w33\,bj4
\end{aligned}\right\} \quad (11)$$

A code length Vij between the i-th and j-th intermediate series in the table 3 can be calculated in accordance with the equation (7). In this embodiment, conversion data with code length Vij more than twice as large as the reference value of the reference weighting value is selected as the modulation code.

In the reproducing system 20 of this embodiment, the equalizing characteristics of the waveform equalizing circuit 22 are selected to have ones shown in the following equation (12) and FIG. 15 corresponding to a class 2 of a partial response so as to correspond to three inter-symbol interferences.

$$Pr(1,2,1) = \cos^2(\pi f / fo) \quad (12)$$

Thus, a level number of the reproducing signal at an output of the waveform equalizing circuit 22 will be 5, as well known. Further, reproducing waves (code patterns) peculiar to the data pattern of each of the respective conversion data in the table 3 can be also obtained in this embodiment as shown in FIG. 14. This code pattern takes five values [2B], [B], [0], [−B] and [−2B] at two sampling points within the detecting period Td where four isolated pulses commonly exist, where B represents a peak value of an isolated pulse.

A pattern length Dpq between the code patterns will be more than twice as large as a peak value of the impulse response of the transmission line composed of the recording system 10 and the reproducing system 20.

As described above, the pattern length Dpq is larger than the code length Vij in the equation (7), and in this embodiment the input pattern data of four bit unit is subject to the maximum likelihood detection with reference to the code patterns of the eight conversion data.

Figure 16:
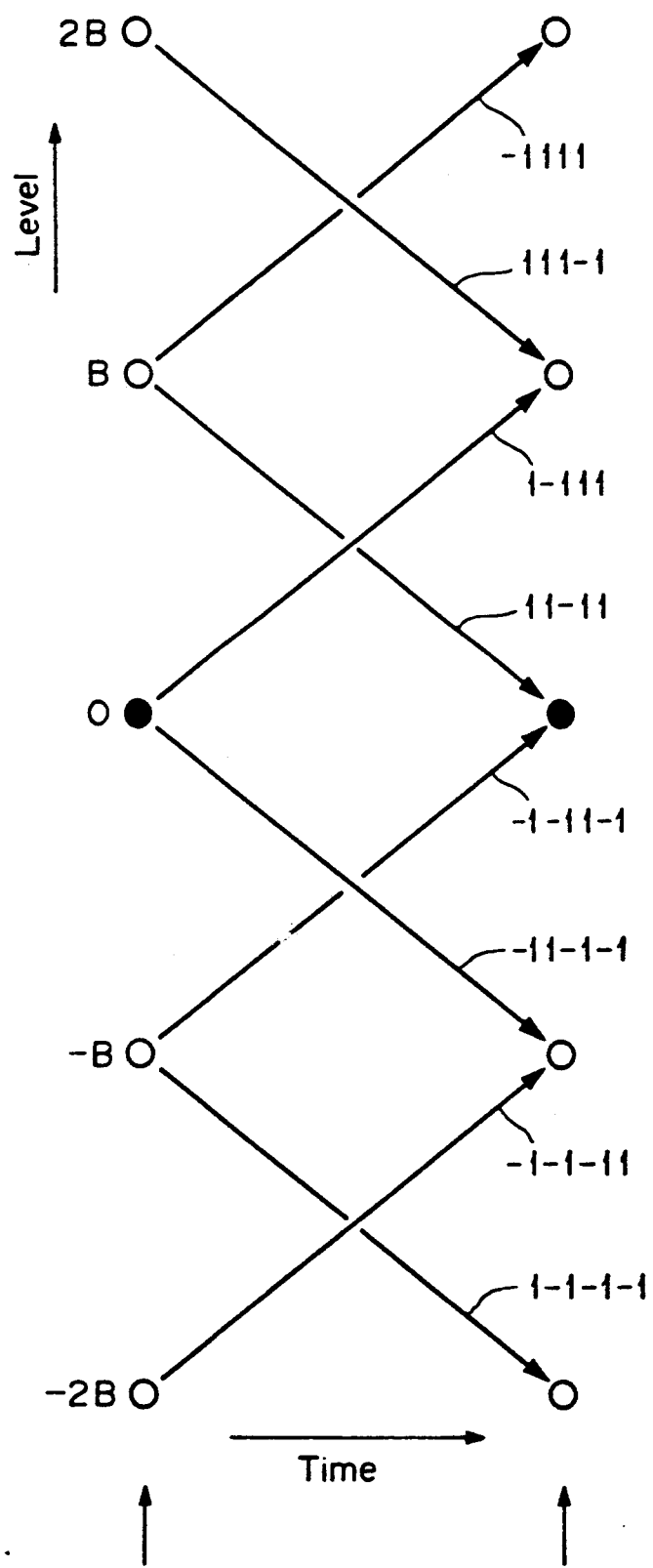
FIG. 16 is a diagram illustrating a reproduced output for explaining the operation of the another embodiment.

Now, in this embodiment, similar to the above embodiment, the reproduced output waveforms with five values can also be represented as shown in FIG. 16 by which correspondence between the intermediate series in the table 3 and the reproduced waveforms will be immediately grasped In the above-described embodiment, two sets of eight conversion data of four bit unit are established from a source data of three bit unit in the data conversion mode, and, in the reproducing mode, the reproducing signal patterns subjected to the waveform equalization by characteristics permitting three inter-symbol interferences are compared with the code pattern group corresponding to the respective conversion data to thereby select one pattern similar to the code patterns to detect the data, so that recording density can be improved remarkably.

Figure 17:
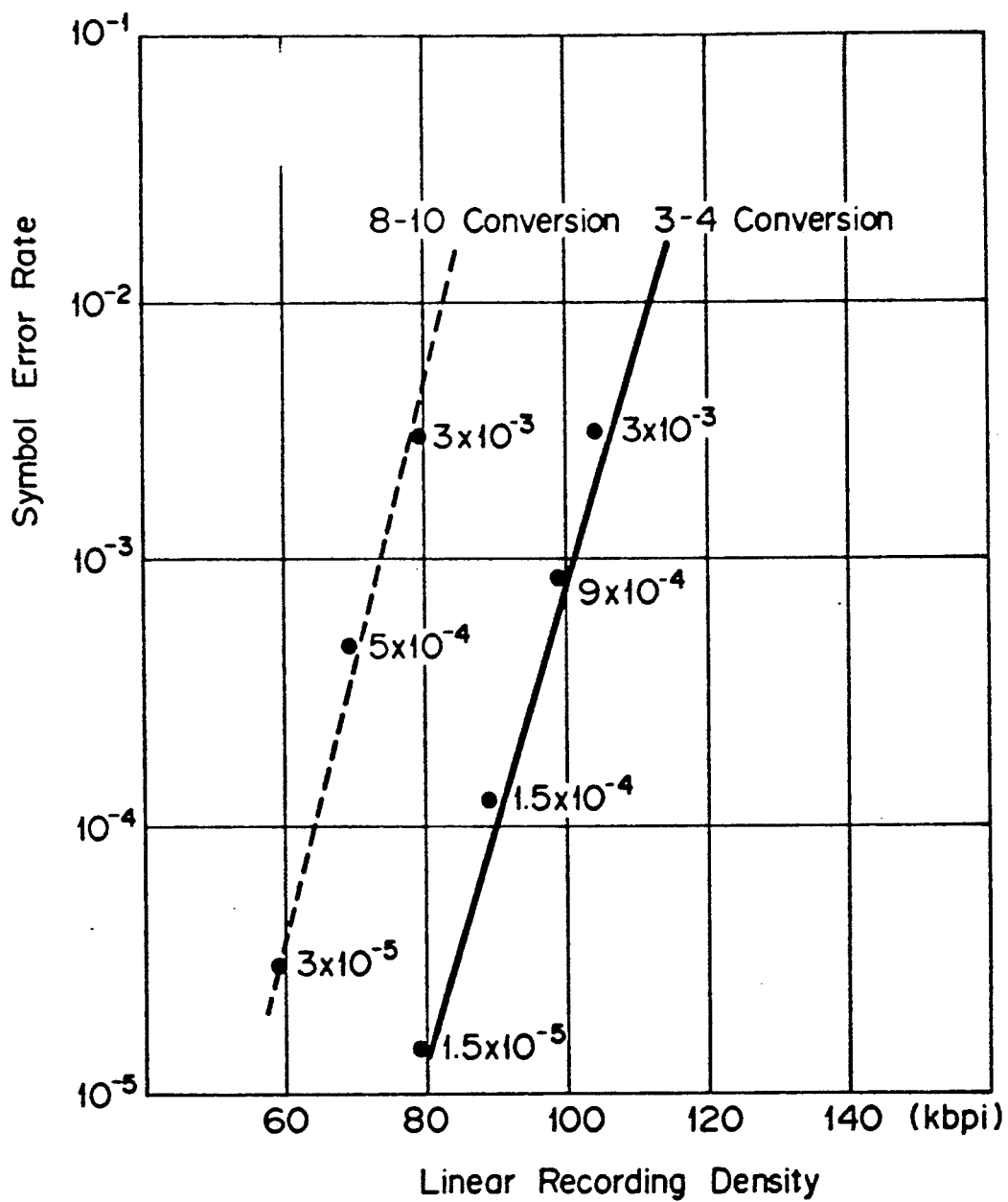
FIG. 17 is a diagram illustrating characteristics for explaining the effects of the another embodiment.

Further, in this embodiment, as shown by a solid line in FIG. 17, a symbol error rate will be about $9 \times 10^{-4}$ when the recording density is 100 kBPI, for example, so that the recording density can be improved remarkably when compared with that of the present digital audio tape recorder (DAT) performing the eight-to-ten conversion wherein a symbol error rate will be same value when the recording density is slightly higher than 70 kBPI as shown by a dashed line.

As described in detail above, according to the above embodiments of the present invention, in a data conversion method of converting the source data of M bit unit to be recorded on a recording medium into the conversion data of N (N is an integer larger than M) bit unit, n (which is a number of inter-symbol interferences permitted in a transmission path) continuous codes in the codes of the conversion data are weighted by such weighting coefficients with a weighting distribution decreasing linearly from the distribution center, the weighted n continuous codes are sequentially added to form the intermediate series, and then such conversion data that the sum of absolute values of differences of each of the same order codes between the intermediate series (that is the code length) is not less than a predetermined number of times as large as a reference value of the weighting coefficient is selected as a modulation code, whereby the pattern length between the code patterns can be made larger to thereby improve the recording density remarkably with using the present recording medium and recording and/or reproducing apparatus.

Further, according to the above embodiments of the present invention, in a data detecting method of detecting the conversion data from the reproduced signal reproduced from a medium wherein the conversion data of N bit unit is recorded, the transmission characteristics of the reproducing system of the recording medium is set so as to permit n inter-symbol interferences, and then the pattern of the reproduced signal corresponding to data to be detected which is set to be N bit unit is compared with the code pattern group corresponding to the respective conversion data to thereby select one pattern which is most similar to the code patterns, whereby the conversion data recorded by a remarkably high density can be surely detected with using the present recording medium and recording and/or reproducing apparatus.

A still another embodiment of the present invention will be explained bellow.

A recording and/or reproducing system to which this embodiment is applied is similar in the constructions thereof to those shown in FIG. 7, so that drawing and explanations thereof will be omitted so as to simplify the explanation.

Figure 18:
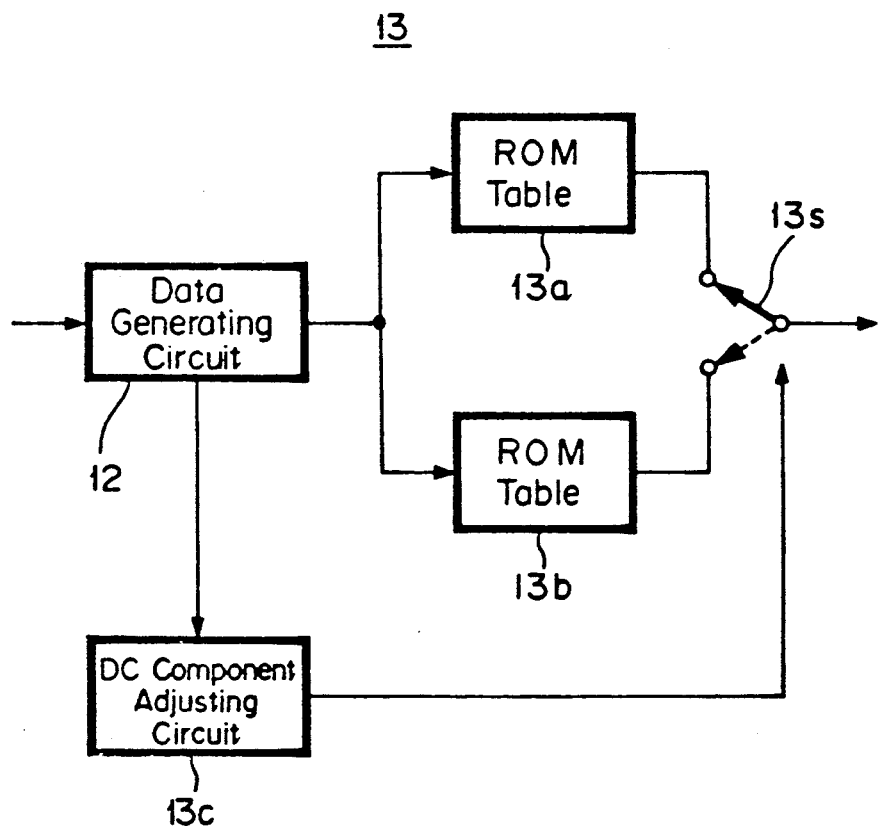
FIG. 18 is a block diagram illustrating a main section of still another embodiment of this invention.

In this embodiment, a data conversion circuit 13 corresponding to that 13 of FIG. 7 has a pair of ROM tables 13a and 13b as shown in FIG. 18 wherein a pair of conversion codes whose DC component distributions differ from each other as shown in Tables 4 and 5 below are stored, respectively. Conversion data or codes (symbol data) read out from the ROM tables 13a and 13b are selectively applied to a recording amplifier 14 through a switch 13s which is controlled by a DC component adjusting circuit 13c.

Figure 19:
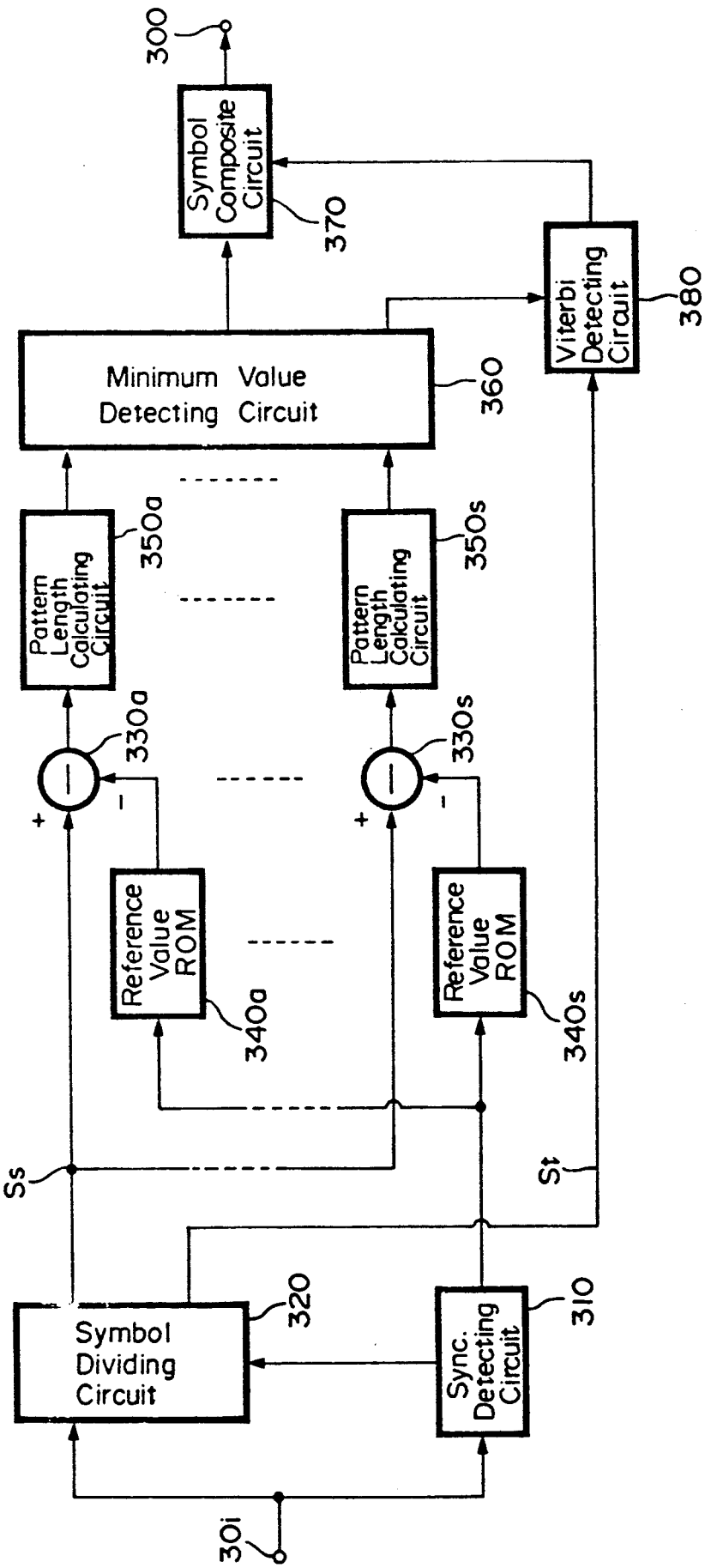
FIG. 19 is a block diagram illustrating another main section of the still another embodiment.
Figure 20A:
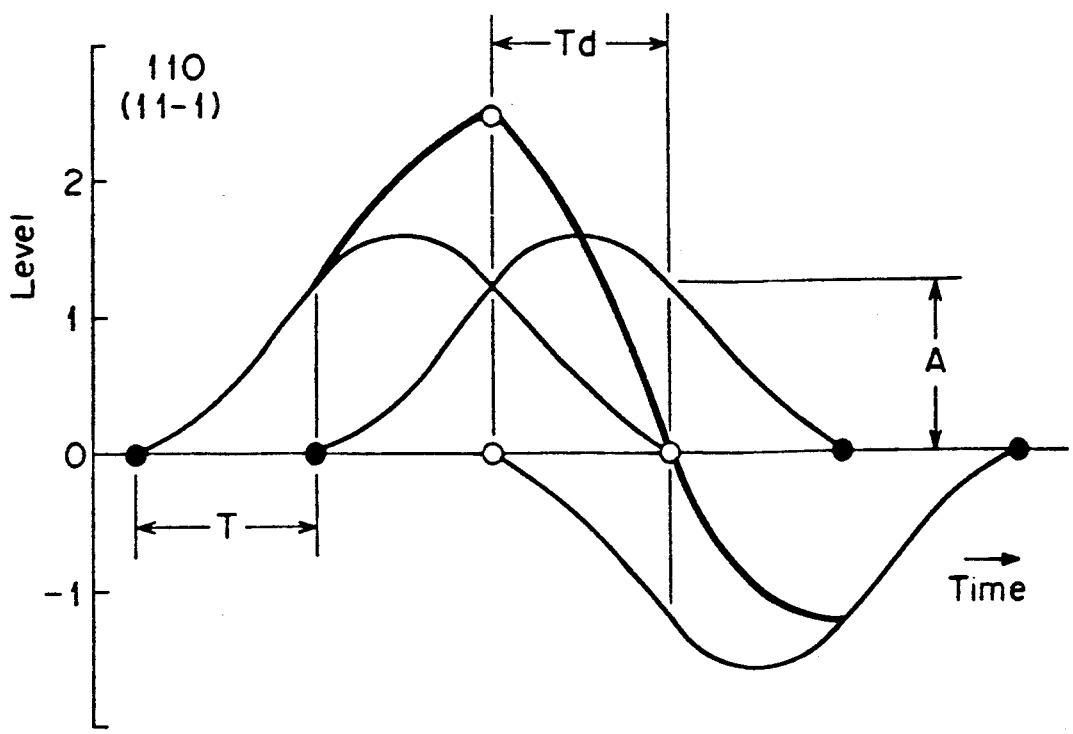
FIG. 20, consisting of FIGS. 20A, 20B, 20C and 20D, is a diagram illustrating reproduced waveforms for explaining the operation of the still another embodiment of this invention.
Figure 20B:
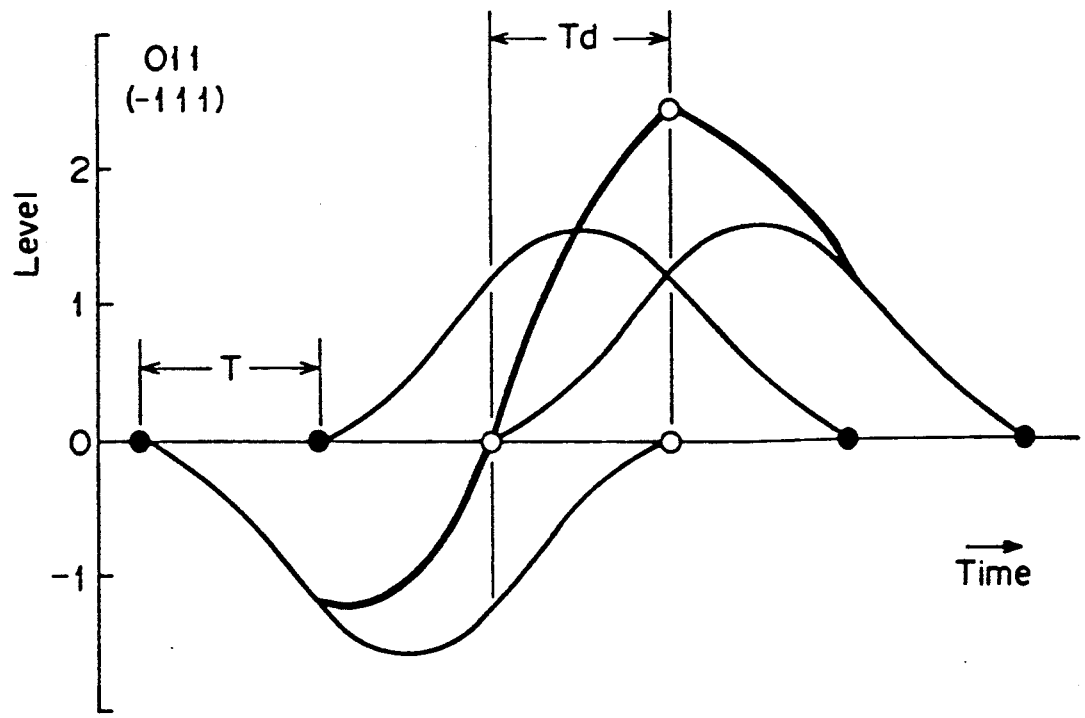
Figure 20C:
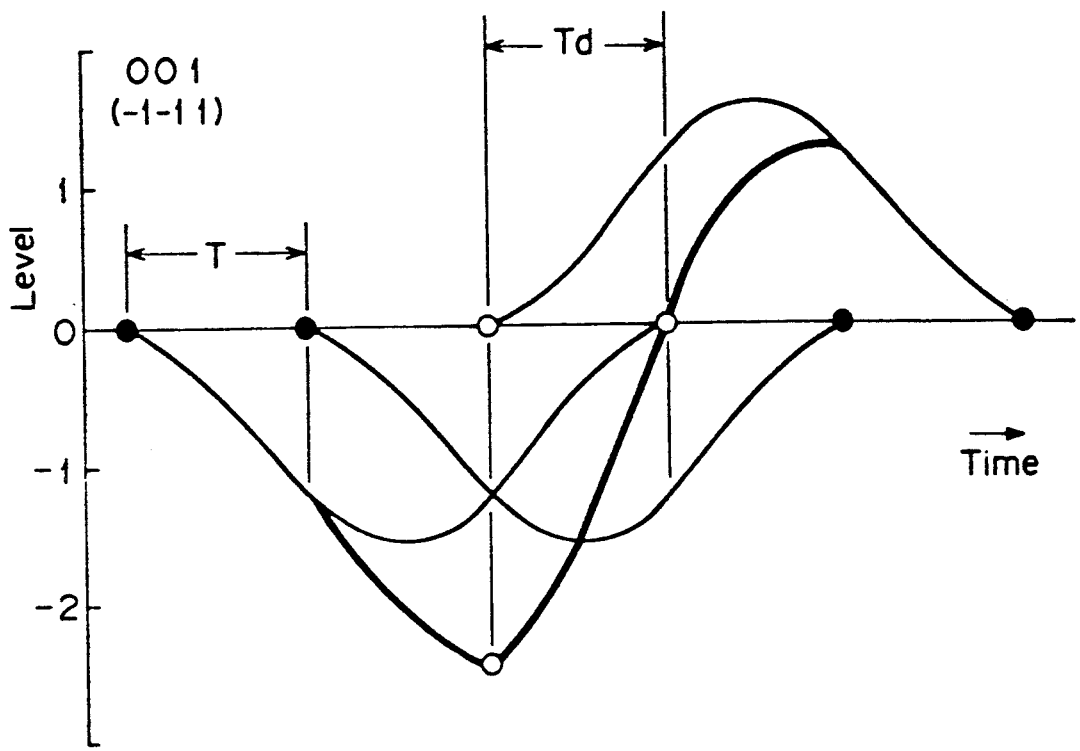
Figure 20D:
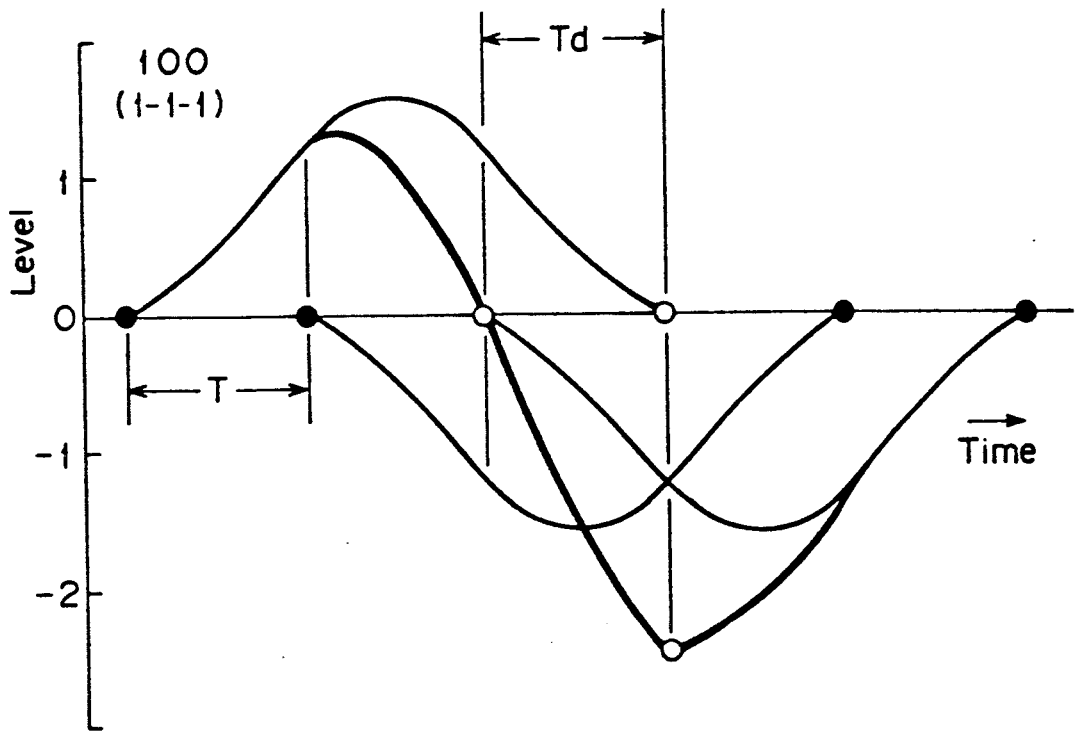

As shown in FIG. 19, in a data detecting circuit 300A of this embodiment, a series of pattern data is applied from an input terminal 30i to a synchronous detecting circuit 310 and a symbol dividing circuit 320. The symbol dividing circuit 320 is controlled by a detection output from the synchronous detecting circuit 310 to divide each pattern data corresponding to the respective conversion data (symbol data) into a preceding portion Ss and a succeeding portion St as shown in the tables 4 and 5 to thereby apply the preceding portion Ss to a plurality of subtracters 330a to 330s.

Reference value ROMs 340a to 340s store waveform values of the preceding portions of the respective code patterns, respectively. The output of the synchronous detecting circuit 310 is commonly applied to the reference value ROMs 340a to 340s which in turn apply their outputs to the corresponding subtracters 330a to 330s, respectively.

Pattern length calculation circuits 350a to 350s are supplied with the corresponding outputs from the subtracters 330a to 330s, respectively. Outputs of the calculation circuits 350a to 350s are applied to a minimum value selecting circuit 360 which in turn applies a preceding portion Ss of a pattern data which is shortest in a pattern length to the waveform values of the preceding portions of the respective code patterns to a symbol composite circuit 370 and a Viterbi detection circuit 380. The succeeding portions St of the pattern data are applied from the symbol dividing circuit 320 to the Viterbi detection circuit 380 which in turn applies its detection output to the symbol composite circuit 370. An output of the symbol composite circuit 370 is applied to an output terminal 300.

Explanations of the code patterns and the pattern length will be made in detail below.

In this embodiment, the data conversion circuit 13 of the recording system 10 performs the four-to-six conversion wherein sixteen source (original) data of four bit unit are converted into conversion data (modulation data) of six bit unit, as shown in the tables 4 and 5.

TABLE 4

| Source data | Conversion data | | DC comp. |
|---|---|---|---|
| | Preceding portion | Succeeding portion | |
| 0 0 0 0 | 0 0 1 | 0 0 1 | −2 |
| 0 0 0 1 | 0 0 1 | 0 1 1 | 0 |
| 0 0 1 0 | 0 0 1 | 1 0 1* | 0 |
| 0 0 1 1 | 0 0 1 | 1 1 0 | 0 |
| 0 1 0 0 | 0 1 1 | 0 0 1 | 0 |
| 0 1 0 1 | 0 1 1 | 0 1 0* | 0 |
| 0 1 1 0 | 0 1 1 | 1 0 0 | 0 |
| 0 1 1 1 | 0 1 1 | 1 1 0 | +2 |
| 1 0 0 0 | 1 0 0 | 0 0 1 | −2 |
| 1 0 0 1 | 1 0 0 | 0 1 1 | 0 |
| 1 0 1 0 | 1 0 0 | 1 0 1* | 0 |

TABLE 4-continued

| Source data | Conversion data | | |
|---|---|---|---|
| | Preceding portion | Succeeding portion | DC comp. |
| 1 0 1 1 | 1 0 0 | 1 1 0 | 0 |
| 1 1 0 0 | 1 1 0 | 0 0 1 | 0 |
| 1 1 0 1 | 1 1 0 | 0 1 0* | 0 |
| 1 1 1 0 | 1 1 0 | 1 0 0 | 0 |
| 1 1 1 1 | 1 1 0 | 1 1 0 | +2 |

TABLE 5

| Source data | Conversion data | | |
|---|---|---|---|
| | Preceding portion | Succeeding portion | DC comp. |
| 0 0 0 0 | 1 1 0 | 1 1 0 | +2 |
| 0 0 0 1 | 0 0 1 | 0 1 1 | 0 |
| . | . | . | . |
| 0 1 1 0 | 0 1 1 | 1 0 0 | 0 |
| 0 1 1 1 | 1 0 0 | 0 0 1 | −2 |
| 1 0 0 0 | 0 1 1 | 1 1 0 | +2 |
| 1 0 0 1 | 1 0 0 | 0 0 1 | 0 |
| . | . | . | . |
| 1 1 1 0 | 1 1 0 | 1 0 0 | 0 |
| 1 1 1 1 | 0 0 1 | 0 0 1 | −2 |

The conversion data in the table 4 is divided into the preceding portion codes of three bit unit and the succeeding portion codes of three bit unit. The preceding portion codes use four data patterns among normal eight data patterns of three bits, and almost of the four data patterns are used in the succeeding portion codes. Further, as shown by * in this table, the succeeding portion codes use data patterns not existing in the preceding portion codes so as to adjust sum of the DC components of all the modification codes (conversion data) to be [0], but actually the DC components of some of the conversion data (modification codes) can not be completely adjusted to be zero and so there remain some modification codes having some DC components.

In this embodiment, the four modulation codes in the table 4 where the DC components remain are replaced by the modulation codes of the table 5 having DC components of opposite polarity to that of the modulation codes of the table 4 to thereby form second modulation codes. The DC component adjusting circuit 13c of the data conversion circuit 13 shown in FIG. 18 compares sum of frequencies of the source data "0000" and "1000" with sum of frequencies of the source data "0111" and "1111" of the tables 4 and 5 thereby selectively changing over the switch 13s to selectively apply one of the modulation codes of the tables 4 and 5 to the amplifier 14 in accordance with the result of the comparison, so that the DC component can be adjusted to be [0].

TABLE 6

| Conversion data (preceding portion) | Substitution data | Intermediate series | |
|---|---|---|---|
| 0 0 1 | −1 −1 1 | −4/3 | 0 |
| 0 1 1 | −1 1 1 | 0 | 4/3 |
| 1 0 0 | 1 −1 −1 | 0 | −4/3 |
| 1 1 0 | 1 1 −1 | 4/3 | 0 |

The above described DC components (substitution data) are obtained by replacing "0" in each of the four data patterns of the preceding portions "001", "011", "100" and "110" by "−1" as shown in the table 6.

The intermediate series of this table is formed by combining three values [4/3], [0] and [−4/3] in different manners and it is formed as follow.

At first, the number of inter-symbol interferences permitted depending on the characteristics of a transmission line is set to be n and such weighting coefficients w as distributed so as to be decreased linearly from the center are provided as shown in FIG. 21 and a Table 7.

TABLE 7

| Number of interference (n) | Weighting coefficients (w) | | | | | |
|---|---|---|---|---|---|---|
| 2 | | | 2/3 | 2/3 | | |
| 3 | | | 2/4 | 4/4 | 2/4 | |
| 4 | | 2/5 | 4/5 | 4/5 | 2/5 | |
| 5 | 2/6 | 4/6 | 6/6 | 4/6 | 2/6 | |
| . | | | | | | |
| ne (even) | $\frac{2}{n+1}$ ··· | $\frac{n-2}{n+1}$ | $\frac{n}{n+1}$ | $\frac{n}{n+1}$ | $\frac{n-2}{n+1}$ | ··· $\frac{2}{n+1}$ |
| no (odd) | $\frac{2}{n+1}$ ··· | $\frac{n-1}{n+1}$ | $\frac{n+1}{n+1}$ | $\frac{n-1}{n+1}$ | ··· $\frac{2}{n+1}$ | |

Next, respective n continuous codes of each set of the substitution codes of Ns codes in the table 6 are weighted by using the weighting coefficients.

Namely, supposing that codes of i-th substitution codes in the table 6 are ai1, ai2 and ai3 and that weighting coefficients in the table 7 when two inter-symbol interferences are permitted are w21 and w22 (w21=w22), each of two sets of substitution codes ai1, ai2 and ai2, ai3 are weighted to obtain following two sets of values.

[w21·ai1 ; w22·ai2]

[w21·ai2 ; w22·ai3]

Thus, the weighted two codes in each of the two sets of continuous codes are added as shown in following equations (12) to thereby form first and second codes Ui1 and Ui2 of the i-th intermediate series.

$$\left.\begin{array}{l} Ui1 = w21 \cdot ai1 + w22 \cdot ai2 \\ Ui2 = w21 \cdot ai2 + w22 \cdot ai3 \end{array}\right\} \quad (12)$$

Similarly, first and second codes Uj1 and Uj2 of a j-th intermediate series can be formed as shown in following equations (13).

$$\left.\begin{array}{l} Uj1 = w21 \cdot aj1 + w22 \cdot aj2 \\ Uj2 = w21 \cdot aj2 + w22 \cdot aj3 \end{array}\right\} \quad (13)$$

The intermediate series of the respective preceding portion codes are different from one another as clear from the table 6, and a code length Vij representing a degree of non-analogy between a pair of the intermediate series Ui and Uj can be defined by the following equation (14) as a sum of absolute values of differences between respective k-th codes of a pair of the intermediate series Ui and Uj.

$$V_{ij} = |U_{i1} - U_{j1}| + |U_{i2} - U_{j2}| = \sum_k |U_{ik} - U_{jk}| \quad (14)$$

In this embodiment, conversion data having a code length Vij more than twice as large as a reference value of the weighting coefficient is selected as a preceding portion of a modulation code. The reference value corresponds to the peak value of an impulse response in accordance with the total transmission characteristics of the recording system 10 and the reproducing system 20.

Now, the succeeding portion codes of the data patterns shown by * in the table 4 which do not exist in the preceding portion codes are impossible to take a predetermined code length, but the succeeding portion codes can be detected with quality similar to that of the preceding portion codes under a condition that the preceding portion codes are decided as described later, so that the modulation codes can as a whole maintain the predetermined code length.

Figure 22:
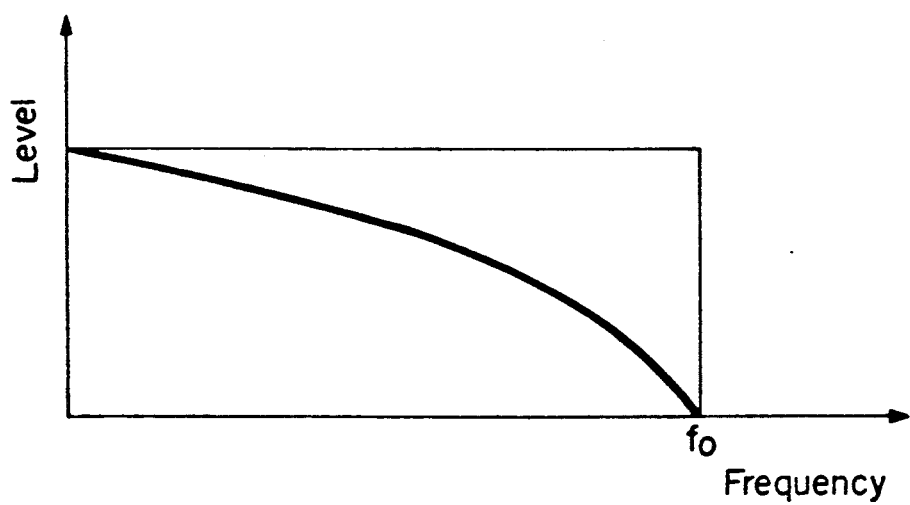
FIG. 22 is a diagram illustrating transmission characteristics of another main section of the still another embodiment.

In the reproducing system 20, the equalizing characteristics of a waveform equalizing circuit 22 are selected to have ones shown in a following equation (15) and FIG. 22 corresponding to a class 1 of a partial response so as to correspond to two inter-symbol interferences.

$$Pr(1,1) = \cos(\pi f / f_o) \quad (15)$$

Thus, a level number of the reproducing signal at an output of the waveform equalizing circuit 22 will be 3, as well known. Further, reproducing waves (code patterns) peculiar to the data pattern of the preceding portion codes of each of the respective conversion data in the tables 4 and 5 can be obtained as shown in FIG. 20. This code pattern takes three values [2A], [0] and [−2A] at two sampling points within a detecting period Td where three isolated pulses commonly exist, where A represents a level of an isolated pulse at a sampling point.

A pattern length Dpq representing a degree of non-analogy between the code patterns P, Q . . . is given by $$Dpq = \sum_k |Spk - Sqk| \quad (16)$$

where Spk and Sqk represent reproduced output levels at sampling points corresponding to respective k-th codes of the pair of the code patterns P and Q, respectively.

In this embodiment, by utilizing the waveform equalizing characteristics shown in FIG. 22 and the equation (15), the pattern length Dpq between the code patterns P, Q . . . respectively corresponding to the preceding portion codes of the conversion data of the tables 4 and 5 will be more than twice as large as a peak value of the impulse response in a transmission path composed of the recording system 10 and the reproducing system 20.

The waveforms of the impulse response have concave configurations where positive peak levels exist at both sides of a center line as shown in FIG. 20 etc., so that the pattern length Dpq of the equation (16) will be larger than the code length Vij of the equation (14) calculated based on the weighting coefficients with a linear distribution shown in FIG. 21.

In the data detecting circuit 300A in FIG. 19, the code patterns respectively corresponding to the above-described preceding portion codes of the conversion data are selected as the reference values and then stored into the reference value ROMs 340a to 340s, respectively. The subtracters 330a to 330s compare s (=4) code pattern data stored in the ROMs 340a to 340s with input pattern data (preceding portion codes) of 3 bit unit applied from the symbol dividing circuit 320, respectively. The pattern length calculation circuits 350a to 350s calculate the pattern lengths between the input pattern and the respective code patterns in accordance with the equation (16) based on the results of the comparison from the subtracters 330a to 330s, respectively.

The minimum value selecting circuit 360 selects, among outputs of the pattern length calculation circuits 350a to 350s, one pattern data having a minimum length Dmin from any one of the s code patterns to thereby apply it to the Viterbi detection circuit 380 and the symbol composite circuit 370 as a maximum likelihood detecting data.

The Viterbi detection circuit 380 sequentially selects one of paths which is shorter in length from the succeeding portion code St among the paths connecting respective branches of the Trellis diagram as a remaining path in accordance with the maximum likelihood detection data of the preceding portion code Ss applied from the minimum value selecting circuit 360, so that the succeeding portion code St acting as a convolution code can be detected in equivalently to the maximum likelihood detection in a state where two inter-symbol interferences are permitted.

In this case, the Viterbi detection circuit 380 merely processes six kinds of succeeding portion codes St of three bit unit succeeding to the previously decided preceding portion codes Ss, so that this circuit 380 can detect the succeeding portion codes at a low error rate since data processing times are small.

The symbol composite circuit 370 composes the succeeding portion codes St from the Viterbi detection circuit 380 and the preceding portion codes Ss from the minimum value selecting circuit 360 to thereby apply a composite code to the output terminal 300.

As described above, this embodiment uses the vector coding for the data conversion and detection.

Figure 23:
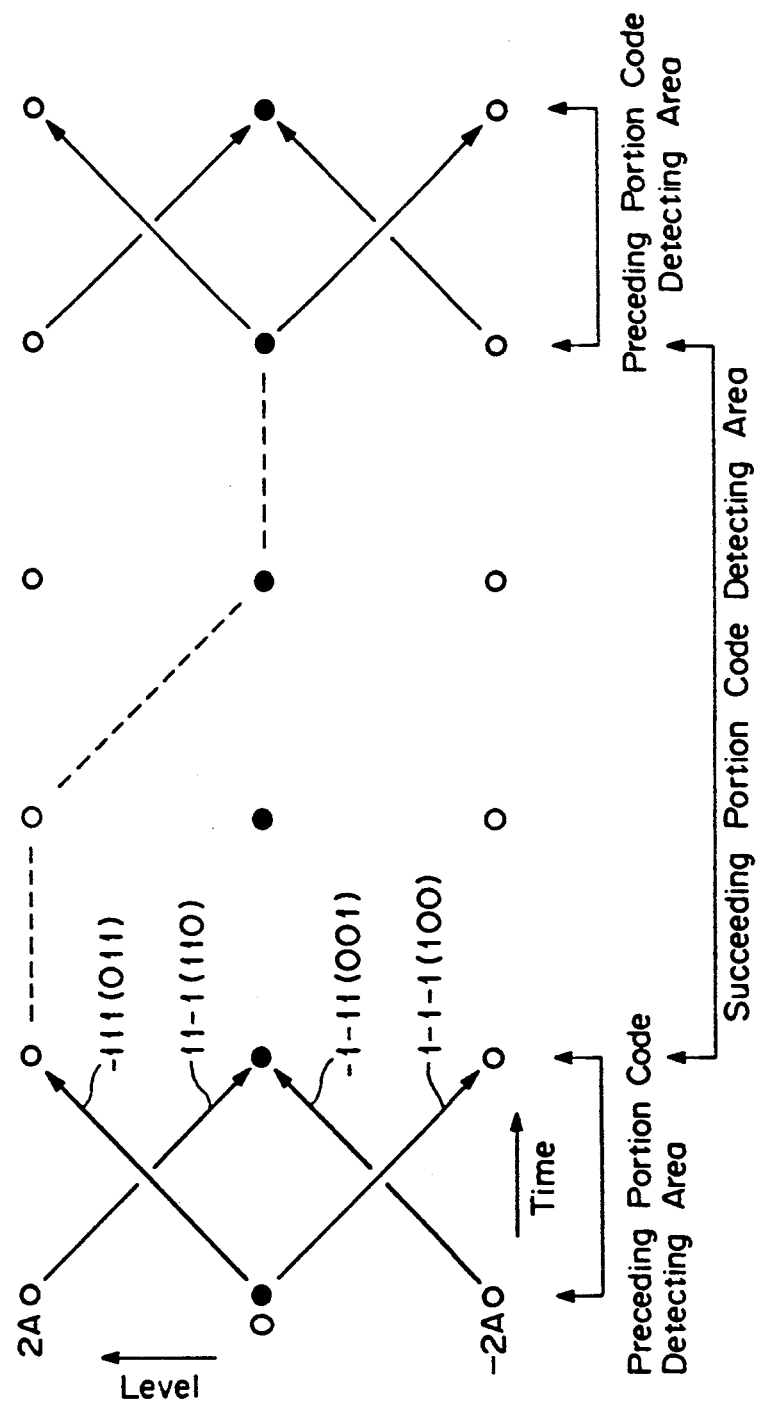
FIG. 23 is a diagram illustrating reproduced output for explaining the operation of the still another embodiment.

Now, the above described reproduced output waveforms with three values can also be represented as shown in FIG. 23 by which correspondence between the intermediate series in the table 6 and the reproduced waveforms will be immediately grasped.

Namely, it is clearly understood that a first bit [−4/3] of the intermediate series of the first substitution data "−1 −1 +1" corresponds to the reproduced output level [−2A] at a preceding sampling point and that a succeeding bit [0] corresponds to the reproduced output level [0] at a succeeding sampling point.

In this case, the reproducing system 20 can be synchronized on the basis of zero cross points of the reproduced waveform shown by black dot points in FIG. 23.

As shown in FIG. 23, in this embodiment four kinds of preceding portion codes mutually disposed with a predetermined pattern length 2A are selected as the codes in a preceding portion codes detecting area, so that the succeeding portion codes sandwiched by the preceding portion codes, which can not have a mutual pattern length 2A by itself, can be detected by the same quality as that of the preceding portion codes under a condition that the preceding portion codes are decided.

Figure 24:
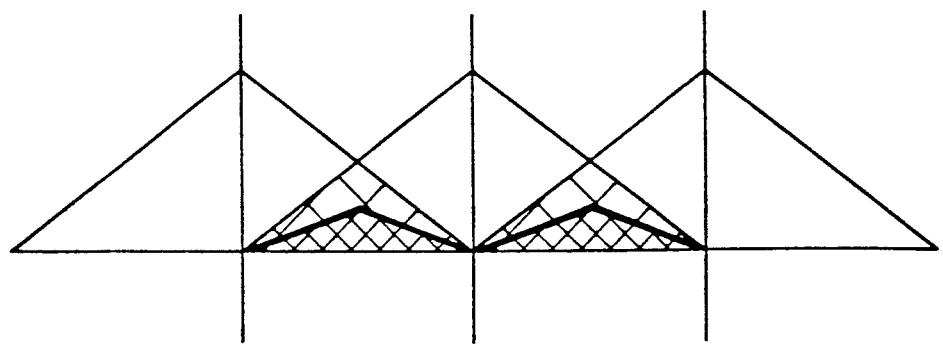
FIG. 24 is a diagram illustrating noise distribution and detection error for explaining the operation of the still another embodiment.

Since this embodiment performs the above-described maximum likelihood detection, error rate due to the noise distribution characteristics linearly decreasing from the three output levels [2A], [0] and [−2A] of FIG. 23 as the center will be an integration of overlapped portions of the noise distribution characteristics which corresponds to an area of finely hatched portions in FIG. 24.

On the other hand, when the three level value detection is performed, error rate due to the noise distribution characteristics respectively having three output levels as center points of FIG. 23 corresponds to an area shown by finely and roughly hatched portions in FIG. 24 where respective noise distribution characteristics are overlapped.

Accordingly, the data detecting method of this embodiment can improve noise-proof characteristics when compared with the simple three level value detection method.

Figure 25:
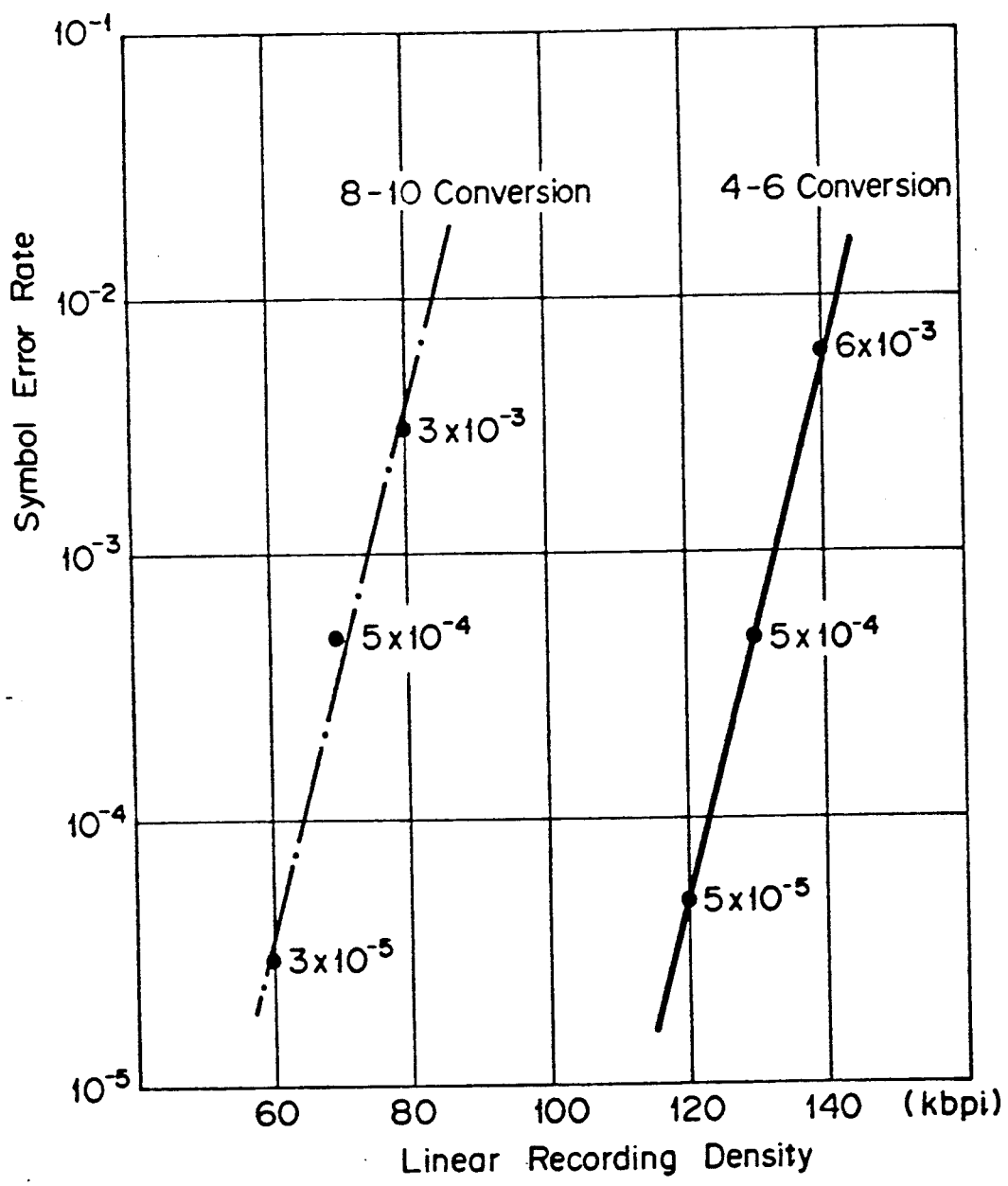
FIG. 25 is a diagram illustrating error rate characteristics for explaining the effects of the still another embodiment.

Further, in this embodiment, as shown by a solid line in FIG. 25, a symbol error rate will be about $5 \times 10^{-4}$ when the recording density is 130 kbpi, for example, so that the recording density can be improved remarkably when compared with that of the present DAT performing the eight-to-ten conversion wherein a symbol error rate will be same value when the recording density is slightly higher than 70 kbpi as shown by a one-dot chain line.

In the above-described embodiment, conversion data of six bit unit composed of the preceding portion codes of three bit unit and the succeeding portion codes of three bit unit are established or decided from a source data of four bit unit at an efficiency [4/6] in the data conversion mode, and, in the reproducing mode, the preceding and succeeding portions of the reproducing signal patterns subjected to the waveform equalization by characteristics permitting two inter-symbol interferences are compared directly or equivalently with the code patterns corresponding to the preceding and succeeding portion codes of the respective conversion data to thereby select one pattern similar to the code patterns to detect the data, so that the number of the data comparing times can be decreased to decrease an error ratio and further the recording density can be improved remarkably.

Next, a method of converting and/or detecting data according to another embodiment of the present invention will be described with reference to FIGS. 26 to 29.

A magnetic recording and/or reproducing system to which the above embodiment is applied is same in the constructions of a recording system 10 thereof as that of FIGS. 1 and 18 and also same in the constructions of a reproducing system 20 thereof as that of FIG. 1.

Figure 26:
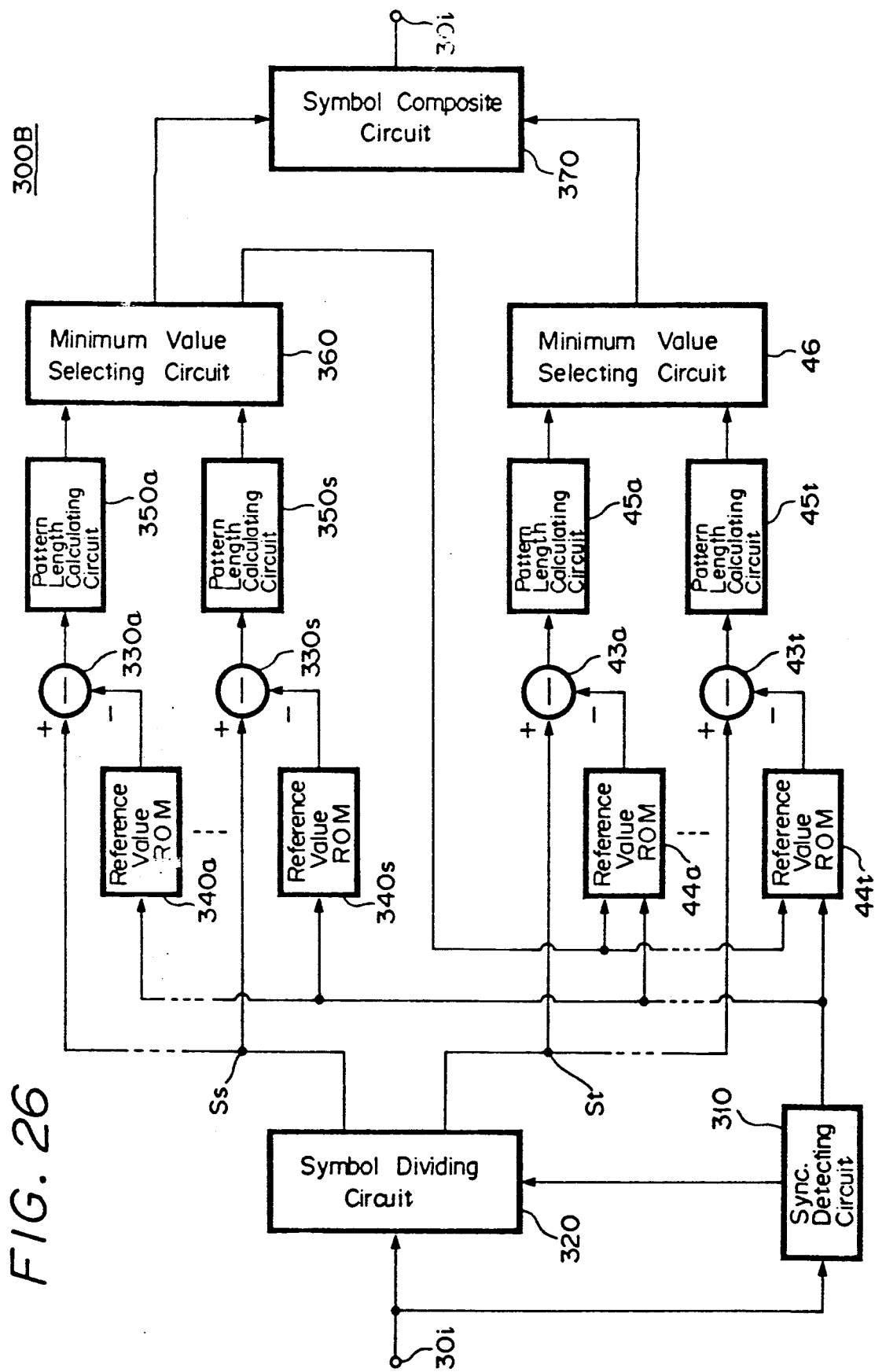
FIG. 26 is a block diagram illustrating a main section of further embodiment of this invention.
Figure 27A:
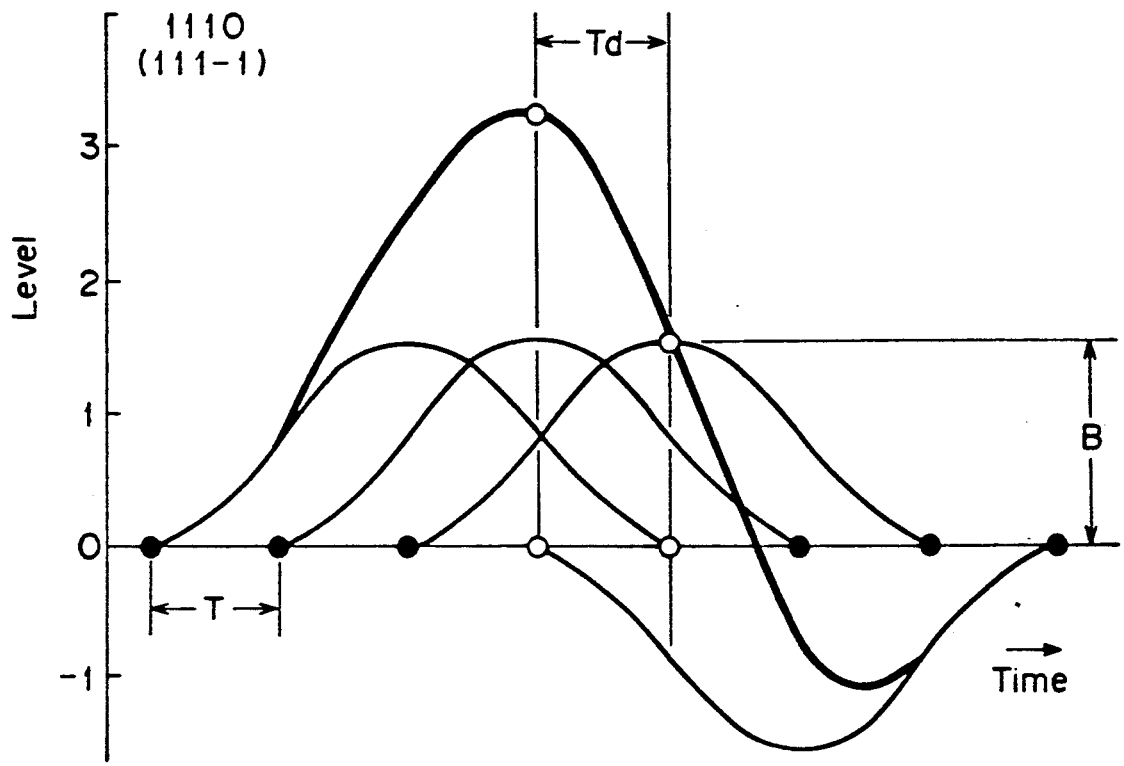
FIG. 27, consisting of FIGS. 27A, 27B, 27C and 27D, is a diagram illustrating reproduced waveforms for explaining the operation of the further embodiment of this invention.
Figure 27B:
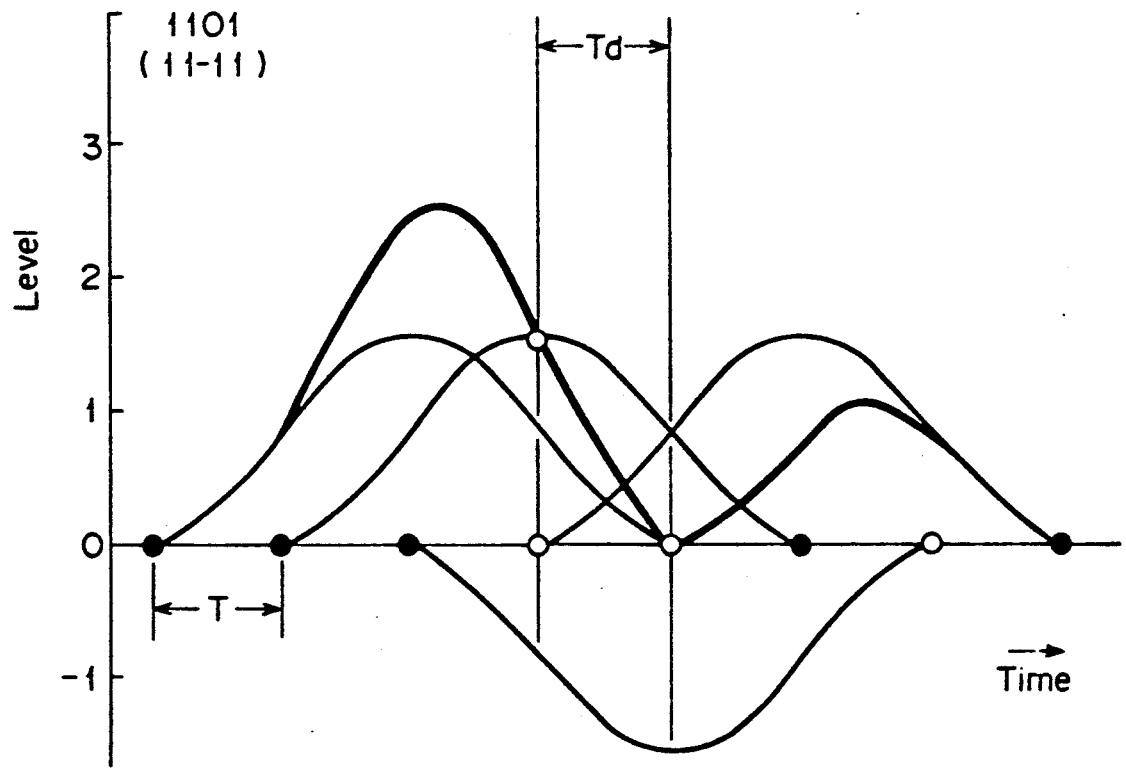
Figure 27C:
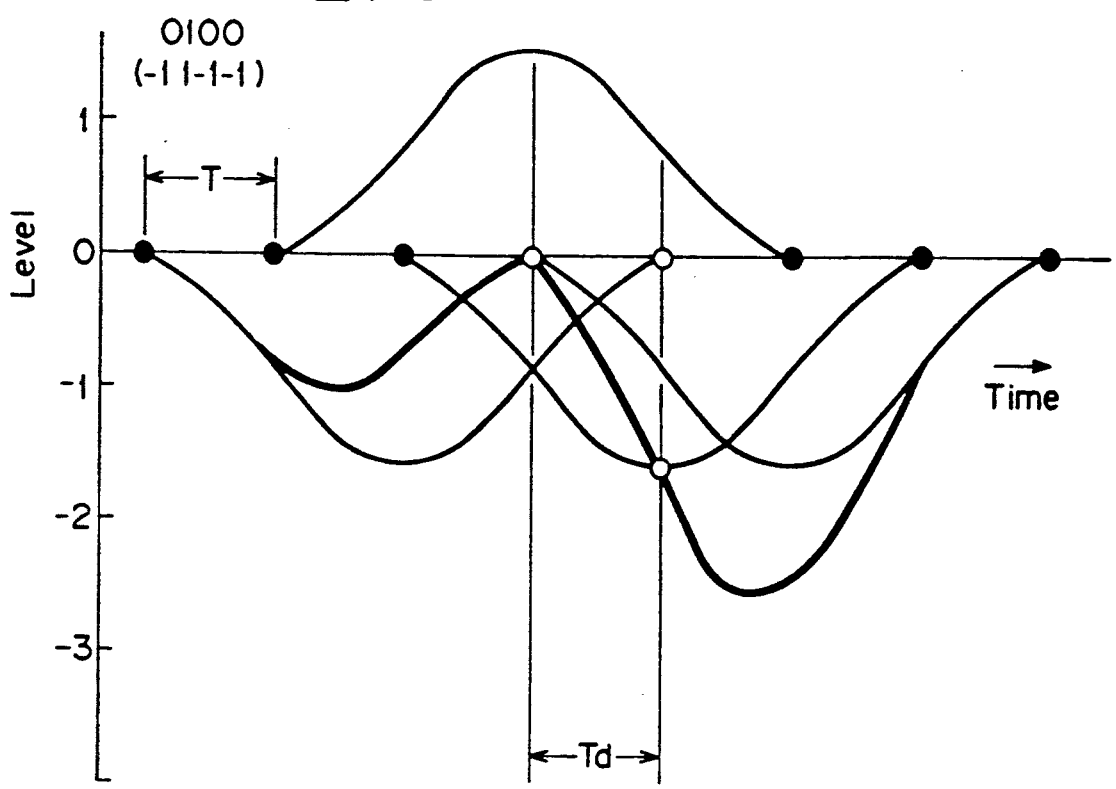
Figure 27D:
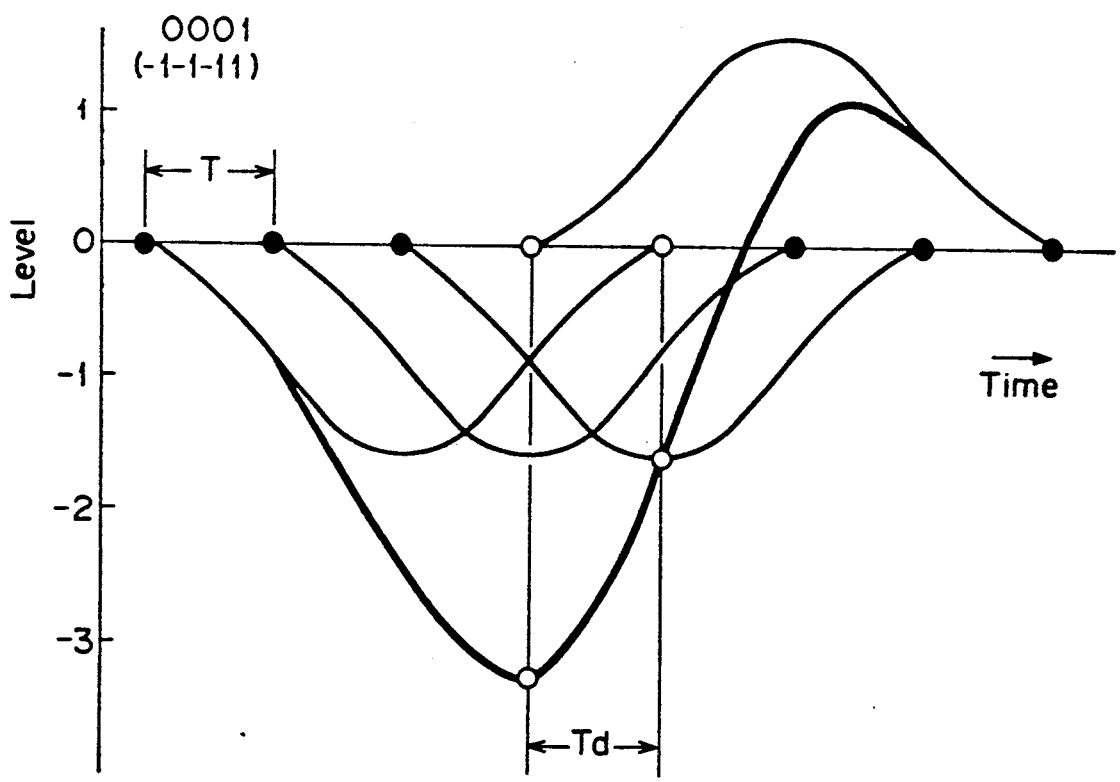

The constructions of a main part of this embodiment are shown in FIG. 26. In FIG. 26, elements corresponding to the elements in FIG. 19 are denoted by the same reference numerals and the explanations of a part thereof will be omitted so as to simplify the explanations.

Referring now to FIG. 26, a symbol dividing circuit 320 of a data detection circuit 300B applies succeeding portion codes St for each pattern data corresponding to respective conversion data (symbol data) shown in following Tables 9 and 10 commonly to subtracters 43a to 43t of a second group. Reference value ROMs 44a to 44t of the second group store waveforms of respective succeeding portion code patterns selected as references, respectively. Each of the ROMs 44a to 44t is supplied with an output from a synchronous detecting circuit 310 and an output from a first minimum value selecting circuit 360 to deliver an output thereof to a corresponding one of the subtracters 43a to 43t of the second group. Outputs of the subtracters 43a to 43t are respectively applied to pattern length calculation circuits 45a to 45t of the second group which in turn apply their outputs to a second minimum value selecting circuit 46. An output of the second minimum value selecting circuit 46 is applied to a symbol composite circuit 370 together with an output of the first minimum value selecting circuit 360. Remaining circuit configuration in FIG. 26 are same as those in FIG. 19.

The operation of the above embodiment will be explained below.

In this embodiment, a relation between a maximum recording repetition frequency fo and a pulse width Wb of an isolated pulse is set as shown in a following equation (17)

$$Wb = 4 \cdot fo \qquad (17)$$

Thus, as shown in FIG. 27 the pulse width Wb is equal to four times as large as the sampling period and so three sampling points are included within the pulse width Wb of each isolated pulse, which is a state where three inter-symbol interferences are permitted. Further, in this embodiment, the data conversion circuit (ROM) 13 of the recording system 10 selects three groups of codes of four bit unit having different DC components with one another as preceding and succeeding portion codes of the conversion data as shown in a following Table 8 and performs the six-to-eight conversion where the 64 source data of six bit unit are converted into the conversion data (modulation code) of eight bit unit as shown in following Tables 9 and 10.

TABLE 8

| | | Conversion data | | | |
|---|---|---|---|---|---|
| Preceding portion | | DC component | Succeeding portion | | DC component |
| A | 1 1 1 0 | +2 | A | 1 1 1 0 | +2 |
| Gp. | 0 1 1 1 | +2 | Gp. | 0 1 1 1 | +2 |
| | 1 1 0 1 | +2 | | 1 1 0 1 | +2 |
| | 1 0 1 1 | +2 | | 1 0 1 1 | +2 |
| B | 0 1 0 0 | −2 | B | 0 1 0 0 | −2 |
| Gp. | 0 0 1 0 | −2 | Gp. | 0 0 1 0 | −2 |
| | 1 0 0 0 | −2 | | 1 0 0 0 | −2 |
| | 0 0 0 1 | −2 | | 0 0 0 1 | −2 |
| | | | C | 1 1 0 0 | 0 |
| | | | Gp. | 0 0 1 1 | 0 |
| | | | | 1 0 0 1 | 0 |
| | | | | 0 1 1 0 | 0 |

TABLE 9

| | Conversion data | | |
|---|---|---|---|
| Source data | Preceding portion | Succeeding portion | DC component |
| 0 0 0 0 0 0 | 1 1 1 0 | 1 1 1 0 | +4 |
| . | . | . | . |
| . | (A) | (A) | . |
| . | . | . | . |
| 0 0 1 1 1 1 | 1 0 1 1 | 1 0 1 1 | +4 |
| 0 1 0 0 0 0 | 1 1 1 0 | 1 1 0 0 | +2 |
| . | . | . | . |
| . | (A) | (C) | . |
| . | . | . | . |
| 0 1 1 1 1 1 | 1 0 1 1 | 0 1 1 0 | +2 |
| 1 0 0 0 0 0 | 1 1 1 0 | 0 1 0 0 | 0 |
| . | . | . | . |
| . | (A) | (B) | . |
| . | . | . | . |

TABLE 9-continued

| Source data | Conversion data | | DC component |
|---|---|---|---|
| | Preceding portion | Succeeding portion | |
| 1 0 1 1 1 1 | 1 0 1 1 | 0 0 0 1 | 0 |
| 1 1 0 0 0 0 | 0 1 0 0 | 1 1 1 0 | 0 |
| . | . | . | . |
| . | (B) | (A) | . |
| . | . | . | . |
| 1 1 1 1 1 1 | 0 0 0 1 | 1 0 1 1 | 0 |

TABLE 10

| Source data | Conversion data | | DC component |
|---|---|---|---|
| | Preceding portion | Succeeding portion | |
| 0 0 0 0 0 0 | 0 1 0 0 | 0 1 0 0 | −4 |
| . | . | . | . |
| . | (B) | (B) | . |
| . | . | . | . |
| 0 0 1 1 1 1 | 0 0 0 1 | 0 0 0 1 | −4 |
| 0 1 0 0 0 0 | 0 1 0 0 | 1 1 0 0 | −2 |
| . | . | . | . |
| . | (B) | (C) | . |
| . | . | . | . |
| 0 1 1 1 1 1 | 0 0 0 1 | 0 1 1 0 | −2 |
| 1 0 0 0 0 0 | 0 1 0 0 | 1 1 1 0 | 0 |
| . | . | . | . |
| . | (B) | (A) | . |
| . | . | . | . |
| 1 0 1 1 1 1 | 0 0 0 1 | 1 0 1 1 | 0 |
| 1 1 0 0 0 0 | 1 1 1 0 | 0 1 0 0 | 0 |
| . | . | . | . |
| . | (A) | (B) | . |
| . | . | . | . |
| 1 1 1 1 1 1 | 1 0 1 1 | 0 0 0 1 | 0 |

In the tables 9 and 10, the conversion data is formed by combining a preceding portion code and a succeeding portion code having different DC components to each other so as to adjust total DC components of the conversion data to be zero, but there are some conversion data having some residual DC components.

In this embodiment, the DC component adjusting circuit 13c of the data conversion circuit 13 shown in FIG. 18 may also change over the switch 13s to selectively apply one of the modulation codes of the tables 9 and 10 to the amplifier 14 in accordance with frequencies of the first and second groups of the source data of the tables 9 and 10 in the same manner as described above so as to adjust the DC component to be [0].

TABLE 11

| | Conversion data (preceding portion) | Substitution data | Intermediate series |
|---|---|---|---|
| A | 1 1 1 0 | 1 1 1 −1 | 2 1 |
| | 0 1 1 1 | −1 1 1 1 | 1 2 |
| | 1 1 0 1 | 1 1 −1 1 | 1 0 |
| | 1 0 1 1 | 1 −1 1 1 | 0 1 |
| B | 0 1 0 0 | −1 1 −1 −1 | 0 −1 |
| | 0 0 1 0 | −1 −1 1 −1 | −1 0 |
| | 1 0 0 0 | 1 −1 −1 −1 | −1 −2 |
| | 0 0 0 1 | −1 −1 −1 1 | −2 −1 |
| C | 1 1 0 0 | 1 1 −1 −1 | 1 −1 |
| | 0 0 1 1 | −1 −1 1 1 | −1 1 |
| | 1 0 1 0 | 1 −1 1 −1 | −1 −1 |
| | 0 1 1 0 | −1 1 1 −1 | 1 1 |

The above-described DC components are obtained by replacing "0" in each of 12 data patterns of codes of the three groups in the table 8 by "−1", as shown in the above table 11.

The intermediate series of the table 11 are formed by combining five values [2], [1], [0],[−1] and [−2] in different combinations with one another and they can be formed in a following manner.

At first, three continuous codes of each set of four codes bi1 to bi4 and bj1 to bj4 of the i-th and j-th substitution data in the table 11 are weighted by using the weighting coefficients w31, w32 and w33 (w31=w33) shown in the table 7 and FIG. 21.

Next, the weighted three codes in each of the four sets of continuous codes are added as shown in following equations (18) to thereby form first and second codes Ui1, Ui2 ; Uj, Uj2 of the i-th and j-th intermediate series of the table 11.

$$\left.\begin{array}{l}Ui1 = w31 \cdot bi1 + w32 \cdot bi2 + w33 \cdot bi3 \\ Ui2 = w31 \cdot bi2 + w32 \cdot bi3 + w33 \cdot bi4 \\ Uj1 = w31 \cdot bj1 + w32 \cdot bj2 + w33 \cdot bj3 \\ Uj2 = w31 \cdot bj2 + w32 \cdot bj3 + w33 \cdot bj4\end{array}\right\} \quad (18)$$

A code length Vij between the i-th and j-th intermediate series of the table 11 can be obtained according to the equation (14).

In this embodiment, such conversion data which code length Vij is more than twice as large as a reference value of the weighting coefficient is selected as all of the preceding portion codes and most of the succeeding portion codes of the modulation code.

Now, the succeeding portion codes of the C group of the table 8 are impossible to take a predetermined code length between them and the succeeding portion codes of the A and B groups, but the succeeding portion codes of the C group can be detected with quality similar to that of the preceding portion codes under a condition that the preceding portion codes are decided as described later, so that the modulation codes can as a whole maintain the predetermined code length.

Figure 28:
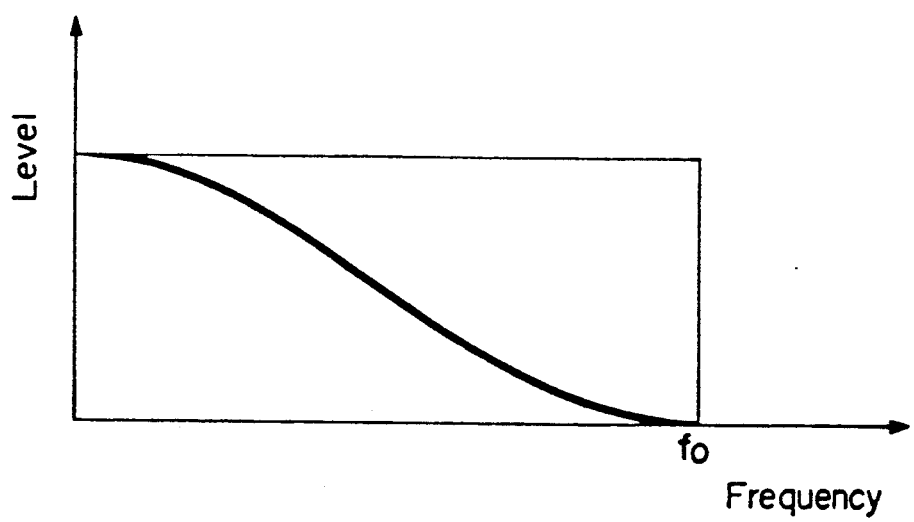
FIG. 28 is a diagram illustrating transmission characteristics of the main section of the further embodiment.

In a reproducing system 20 in this embodiment, the equalizing characteristics of a waveform equalizing circuit 22 are selected to have ones shown in a following equation (19) and FIG. 28 corresponding to a class 2 of a partial response so as to correspond to three inter-symbol interferences.

$$Pr(1,2,1) = \cos^2(\pi f/fo) \quad (19)$$

Thus, a level number of the reproducing signal at an output of the waveform equalizing circuit 22 will be 5, as well known. Further, reproducing waves (code patterns) corresponding to the preceding and succeeding portion codes of each of the respective conversion data in the tables 9 and 10 can be obtained. As shown in FIG. 27, this code pattern takes five values [2B], [B], [0], [−B] and [−2B] at two sampling points within a detecting period Td where four isolated pulses commonly exist, where B represents a peak value of an isolated pulse.

A pattern length Dpq between the code patterns of the preceding and succeeding portion codes of the A and B groups will be more than twice as large as a peak value of the impulse response of the transmission line composed of the recording system 10 and the reproducing system 20.

As described above, the pattern length Dpq is larger than the code length Vij in the equation (7), and in this embodiment the input pattern data of four bit unit is subject to the maximum likelihood detection with reference to the code patterns of the conversion data having the eight preceding portion codes and the twelve succeeding portion codes.

Now, in this embodiment, the reproduced output waveforms with five values can also be represented as shown in FIG. 29 by which correspondence between the intermediate series in the table 11 and the reproduced waveforms will be immediately grasped.

In the above-described embodiment, conversion data of eight bit unit composed of the preceding portion codes of four bit unit and the succeeding portion codes of four bit unit are established or decided from a source data of six bit unit at an efficiency [6/8] in the data conversion mode, and, in the reproducing mode, the preceding and succeeding portions of the reproducing signal patterns subjected to the waveform equalization by characteristics permitting three inter-symbol interferences are compared directly with the code patterns corresponding to the preceding and succeeding portion codes of the respective conversion data to thereby select one pattern similar to the code patterns to detect the data, so that the number of the data comparing times can be decreased to decrease an error ratio and further the recording density can be improved remarkably.

As described in detail above, according to the present invention, in a data conversion method of converting the source data of M bit unit to be recorded on a recording medium into the conversion data of N (N is an integer larger than M) bit unit, N codes of the conversion data are divided into Ns preceding portion codes and Nt succeeding portion codes, n (which is a number of inter-symbol interferences permitted in a transmission path) continuous codes in the Ns preceding portion codes or the Nt succeeding portion codes of the conversion data are weighted by such weighting coefficients with a weighting distribution decreasing linearly from the distribution center, the weighted n continuous codes are sequentially added to form the intermediate series, and then such conversion data that the sum of absolute values of differences of each of the same order codes between the intermediate series (that is the code length) is more than a predetermined number of times as large as a reference value of the weighting coefficient is selected at least as the preceding portion codes of the conversion data, whereby the pattern length between the code patterns can be made larger to thereby decrease the error ratio in the reproducing mode and improve the recording density remarkably while using the present recording medium and recording and/or reproducing apparatus.

Further, according to the present invention, in a data detecting method of detecting the conversion data from the reproduced signal reproduced from a medium wherein the conversion data of N bit unit is recorded, the transmission characteristics of the reproducing system of the recording medium is set so as to permit n inter-symbol interferences, the conversion data of N bit unit is divided into the preceding portion codes of Ns bit unit and the succeeding portion codes of Nt bit unit which are data to be detected, and then at least in case of detecting the preceding portion codes of the conversion data, the pattern of the reproduced signal corresponding to data to be detected is compared with the code patterns corresponding to the respective conversion data to thereby select one pattern which is most similar to the code patterns, whereby the conversion data recorded by a remarkably high density can be surely detected at a low error ration with using the present recording medium and recording and/or reproducing apparatus.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

We claim as our invention:

1. A data recording method comprising the steps of:
   generating source data of M bit unit;
   converting said source data into conversion data of N ($>$M) bit unit, where N and M are integers;
   weighting n, which is a number of inter-symbol interferences permitted in accordance with characteristics of a transmission path, continuous codes in N codes of the conversion data by weighting coefficients in such a manner that a weighting distribution decreases linearly from a reference value of a distribution center;
   sequentially adding the weighted n continuous codes to thereby form intermediate series of (N$-$n$+$1) bit unit;
   selecting such of the conversion data that the sum of absolute values of differences of codes between the intermediate series is more than a predetermined number of times as large as a reference value of the weighting coefficient as a code; and
   recording the selected conversion data on a recording medium.

2. A data reproducing method comprising the steps of:
   employing a reproducing system to reproduce conversion data previously recorded on a recording medium;
   setting transmission characteristics of the reproducing system so as to permit n inter-symbol interferences, where n is an integer;
   setting data to be detected to be an N bit unit, where N is an integer;
   comparing a pattern of the reproduced signal corresponding to the data to be detected with a plurality of predetermined patterns defined by the conversion data;
   selecting a pattern from the plurality of the predetermined patterns which is similar to the signal pattern to thereby detect data; and
   generating an output signal in accordance with the selected pattern.

3. A data recording method comprising the steps of:
   generating source data of M bit unit;
   converting said source data into conversion data of N ($>$M) bit unit, where M and N are integers;
   dividing N codes of the conversion data into Ns preceding portion codes, where Ns and Nt are integers, and Nt succeeding portion codes;
   weighting n, which is a number of inter-symbol interferences permitted in accordance with characteristics of a transmission path, continuous codes in the Ns preceding portion codes or the Nt succeeding portion codes of the conversion data by weighting coefficients with a weighting distribution decreasing linearly from the distribution center;
   sequentially adding weighted n continuous codes to thereby form an intermediate series of (Ns$-$n$+$1) bit unit or (Nt$-$n$+$1) bit unit;

selecting such of the conversion data that the sum of absolute values of differences of codes between the intermediate series is more than a predetermined number of times as large as a reference value of the weighting coefficient at least as a code of the preceding portion codes of the conversion codes; and recording the selected conversion data on a recording medium.

4. A data reproducing method comprising the steps of:

employing a reproducing system to reproduce conversion data previously recorded on a recording medium;

setting transmission characteristics of the reproducing system so as to permit n inter-symbol interferences, where n is an integer;

setting data to be detected to be a preceding portion data of Ns bit unit and a succeeding portion data of Nt bit unit, where Ns, Nt and N are integers obtained by dividing the conversion data of N bit unit;

comparing, at least in case of detecting the preceding portion codes of the conversion data, a signal pattern of the reproduced signal corresponding to the data to be detected with a plurality of predetermined patterns defined by the conversion data;

selecting a pattern from the plurality of the predetermined patterns which is similar to the signal pattern to thereby detect data; and generating an output signal in accordance with the selected pattern.

* * * * *